(12) United States Patent
Liu et al.

(10) Patent No.: US 12,513,675 B2
(45) Date of Patent: Dec. 30, 2025

(54) TWO-STEP FMCW TRANSMISSION FOR CHANNEL MEASUREMENT ACCURACY ENHANCEMENT

(71) Applicant: QUALCOMM Incorporated, San Diego, CA (US)

(72) Inventors: Kangqi Liu, San Diego, CA (US); Weimin Duan, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 316 days.

(21) Appl. No.: 18/450,349

(22) Filed: Aug. 15, 2023

(65) Prior Publication Data
US 2025/0063552 A1 Feb. 20, 2025

(51) Int. Cl.
*H04W 72/04* (2023.01)
*H04B 17/309* (2015.01)
*H04W 72/0453* (2023.01)

(52) U.S. Cl.
CPC ...... *H04W 72/0453* (2013.01); *H04B 17/309* (2015.01)

(58) Field of Classification Search
CPC .......... H04W 72/0453; H04B 17/309
See application file for complete search history.

(56) References Cited

U.S. PATENT DOCUMENTS

| | | |
|---|---|---|
| 9,591,648 B1 | 3/2017 | Ramamurthy et al. |
| 2019/0349055 A1 | 11/2019 | Bhattad et al. |
| 2019/0391247 A1 | 12/2019 | Gulati et al. |
| 2020/0252907 A1 | 8/2020 | Rune |
| 2021/0239797 A1 | 8/2021 | Cattle et al. |

(Continued)

FOREIGN PATENT DOCUMENTS

| | | |
|---|---|---|
| CN | 106291559 A | 1/2017 |
| CN | 109471095 A | 3/2019 |
| CN | 113691360 A | 11/2021 |

(Continued)

OTHER PUBLICATIONS

International Search Report and Written Opinion—PCT/US2024/039993—ISA/EPO—Nov. 28, 2024.

*Primary Examiner* — Curtis B Odom
(74) *Attorney, Agent, or Firm* — Procopio, Cory, Hargreaves & Savitch LLP

(57) ABSTRACT

A method for wireless communication at a first wireless device and related apparatus are provided. In the method, the first wireless device communicates a first reference signal with a second wireless device based on a first frequency-modulated continuous wave (FMCW). The first wireless device further communicates a second reference signal with the second wireless device. The second reference signal is based on a second FMCW and has a second frequency bandwidth. The second frequency bandwidth is smaller than the first frequency bandwidth of the first reference signal, and the second reference signal has a frequency location based on the first reference signal. The first wireless device further communicates data with the second wireless device based on a channel estimation for a channel between the first wireless device and the second wireless device based on the second reference signal.

30 Claims, 15 Drawing Sheets

(56) References Cited

U.S. PATENT DOCUMENTS

2022/0116886 A1* 4/2022 Manolakos ............. G01S 7/023
2022/0131723 A1 4/2022 Bayesteh et al.

FOREIGN PATENT DOCUMENTS

| CN | 115190419 A | 10/2022 |
| EP | 1851867 B1 | 3/2017 |
| WO | 2018236180 A1 | 12/2018 |
| WO | 2021258239 A1 | 12/2021 |
| WO | 2022150783 A1 | 7/2022 |
| WO | 2022198349 A1 | 9/2022 |

* cited by examiner

TWO-STEP FMCW TRANSMISSION FOR CHANNEL MEASUREMENT ACCURACY ENHANCEMENT

TECHNICAL FIELD

The present disclosure relates generally to communication systems, and more particularly, to frequency-modulated continuous wave (FMCW) transmission for channel measurement accuracy enhancement in wireless communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a first user device. The apparatus may include at least one memory and at least one processor coupled to the at least one memory. Based at least in part on information stored in the at least one memory, the at least one processor, individually or in any combination, may be configured to communicate, with a second wireless device, a first reference signal, the first reference signal based on a first FMCW and having a first frequency bandwidth occupied by the first FMCW; communicate, with the second wireless device, a second reference signal, the second reference signal based on a second FMCW and having a second frequency bandwidth occupied by the second FMCW, the second frequency bandwidth smaller than the first frequency bandwidth, and the second reference signal having a frequency location based on the first reference signal; and communicate, based on the channel estimation for the channel between the first wireless device and the second wireless device based on the second reference signal, data with the second wireless device.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
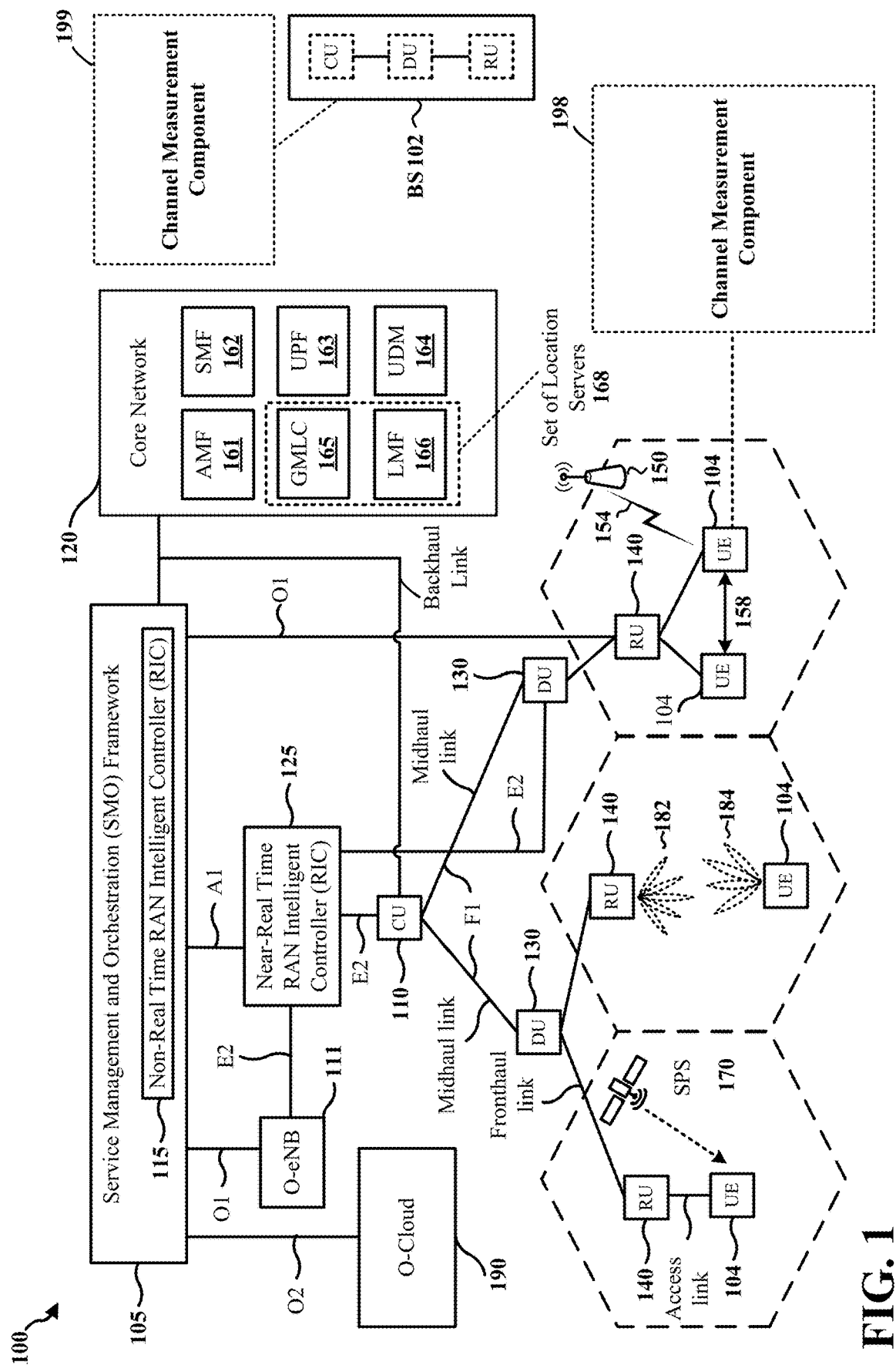
FIG. 1 is a diagram illustrating an example of a wireless communication system and an access network.

A wireless network may have ultra-wide system bandwidth, e.g., ranging from 400 MHz to 8 GHz for Frequency Range 3 (FR3), 6 GHz and sub-terahertz (subTHz) ranges. Performing accurate and efficient channel estimation over such bandwidths can be challenging. Furthermore, different UEs support different capabilities. As an example, some UEs, including mid-tier devices and IoT devices, may not support the full system bandwidth. Therefore, a method that can accommodate varying UE capabilities helps to provide optimal resource allocation. Some methods involve high analog-to-digital converter (ADC) rates for wideband channel estimation, which can lead to increased costs and power consumption. Additionally, some techniques may lack the flexibility for a device to accurately capture a frequency-selective nature of the channel within a wideband context. Aspects presented herein provide for improved flexibility, reduced ADC requirements, and better granularity in channel estimation.

Various aspects relate generally to communication systems. Some aspects more specifically relate to two-step FMCW transmission for channel measurement accuracy enhancement in wireless communication. In some examples, a first wireless device may communicate a first reference signal with, e.g., transmit a first reference signal to, a second wireless device. The first reference signal may be based on a first FMCW and may have a first frequency bandwidth occupied by the first FMCW. The first wireless device may further communicate, e.g., transmit, a second reference signal with the second wireless device. The second reference signal may be based on a second FMCW and may have a second frequency bandwidth occupied by the second FMCW. The second frequency bandwidth may be smaller than the first frequency bandwidth, and the second reference signal may have a frequency location based on the first reference signal. Then, the first wireless device may communicate data with the second wireless device based on a channel estimation for a channel between the first wireless device and the second wireless device based on the second reference signal. In some examples, the first wireless device may be a UE, and the second wireless device may be a network node. In some examples, the first wireless device may be a network node, and the second wireless device may be a UE.

Particular aspects of the subject matter described in this disclosure can be implemented to realize one or more of the following potential advantages. In some examples, by utilizing a two-step FMCW-based method for wideband channel estimation, the described techniques allow for flexible control over the bandwidth being used for channel estimation, resulting in more efficient resource allocation and reduced ADC requirements compared to exiting techniques. In some aspects, by transmitting a first FMCW with a large bandwidth following by a second FMCW with a small bandwidth, the described techniques may provide better channel estimation granularity and improve the accuracy of the channel estimation. In some aspects, the frequency location for the second FMCW with a smaller bandwidth may be based on the first FMCW with a larger bandwidth, which allows for an adaptive process that can adjust to the actual channel conditions and requirements. In some aspects, by allowing either the network or the UE to transmit FMCWs, the described techniques provide adaptability depending on the use case and ensure that the method can be used effectively in a wide range of scenarios.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration.

The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHZ). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR2-2 (52.6 GHZ-71 GHZ), FR4 (71 GHz-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a channel measurement component 198. The channel measurement component 198 may be configured to communicate a first reference signal with a network node, the first reference signal based on a first FMCW and having a first frequency bandwidth occupied by the first FMCW; communicate, with the network node, a second reference signal, the second reference signal based on a second FMCW and having a second frequency bandwidth occupied by the second FMCW, the second frequency bandwidth smaller than the first frequency bandwidth, and the second reference signal having a frequency location based on the first reference signal; and communicate data with the network node based on a channel estimation for a channel between the UE and the network node based on the second reference signal. In certain aspects, the base station 102 may include a channel measurement component 199. The channel measurement component 199 may be configured to communicate a first reference signal with a UE, the first reference signal based on a first FMCW and having a first frequency bandwidth occupied by the first FMCW; communicate a second reference signal with the UE, the second reference signal based on a second FMCW and having a second frequency bandwidth occupied by the second FMCW, the second frequency bandwidth smaller than the first frequency bandwidth, and the second reference signal having a frequency location based on the first reference signal; and communicate data with the UE based on the channel estimation for the channel between the base station and the UE based on the second reference signal. Although the following description may be focused on 5G NR, the concepts described herein may be applicable to other similar areas, such as LTE, LTE-A, CDMA, GSM, and other wireless technologies.

Figure 2:
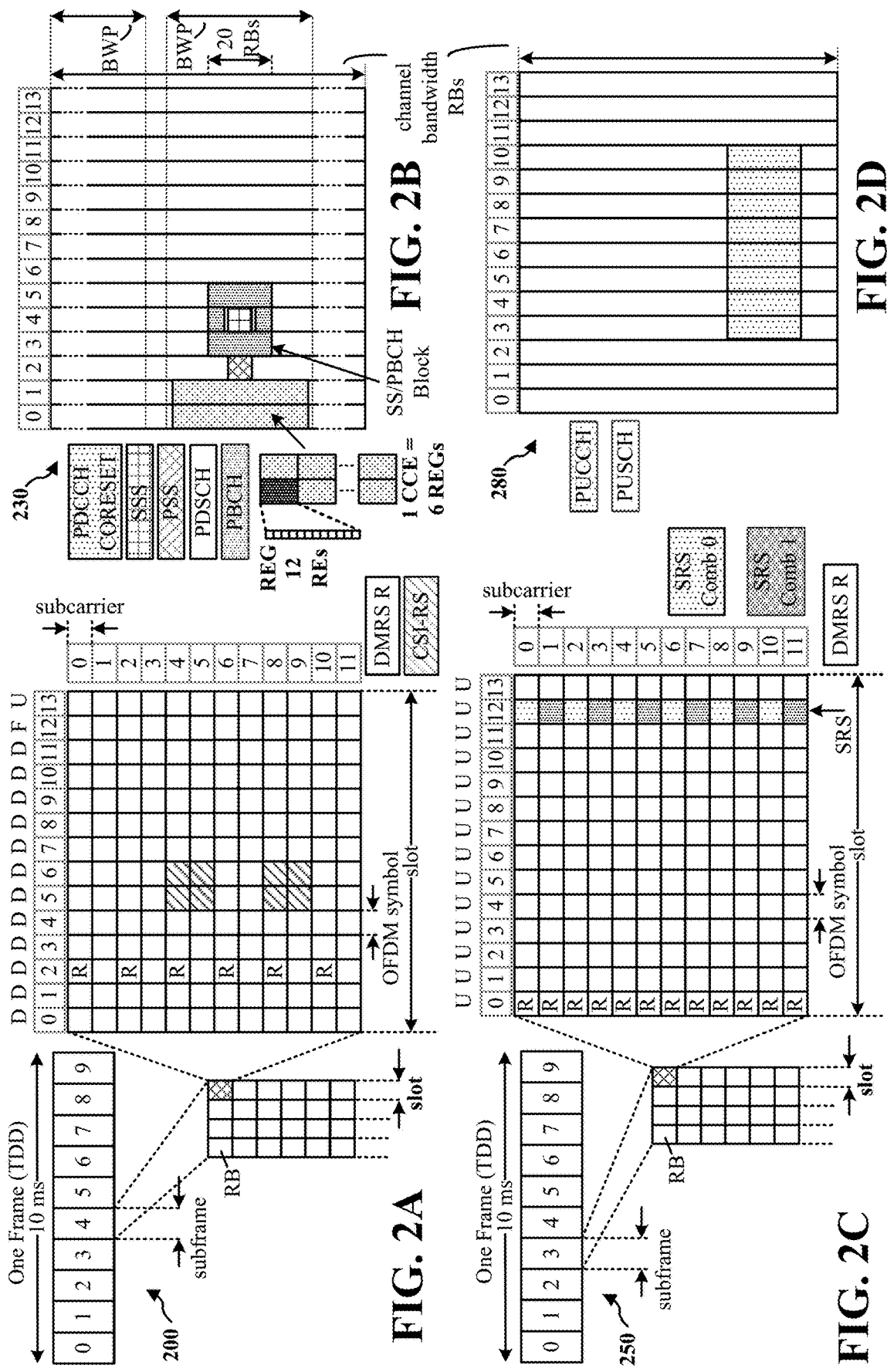
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
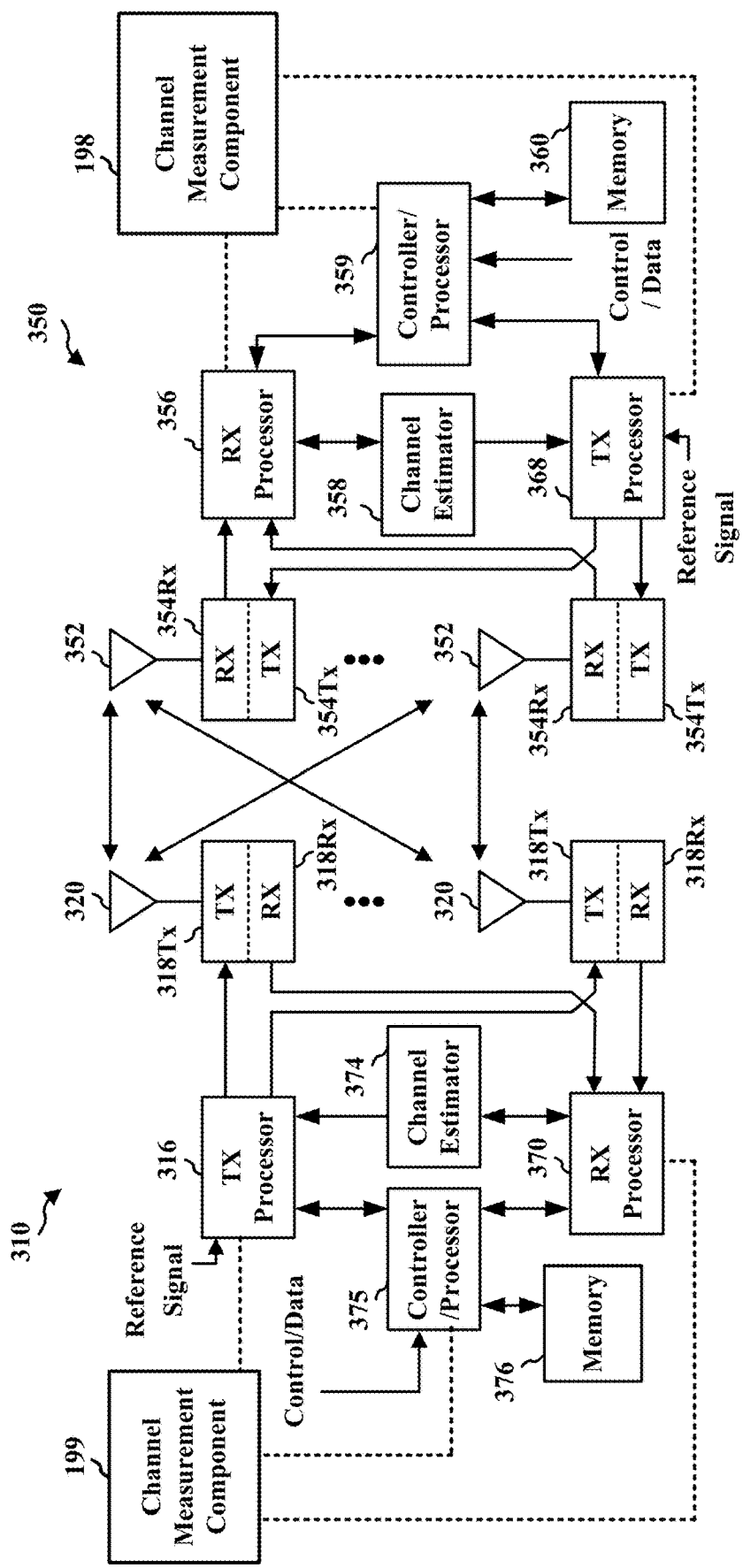
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the channel measurement component 198 of FIG. 1.

At least one of the TX processor 316, the RX processor 370, and the controller/processor 375 may be configured to perform aspects in connection with the channel measurement component 199 of FIG. 1.

Example aspects presented herein provide a two-step approach for performing channel measurements using an FMCW signal for a large BW channel. For example, a device may first use a wideband FMCW to identify a subband. Then, the device may use a narrowband FMCW-RS transmission in the indicated subband to enable improved for channel estimation.

Figure 4:
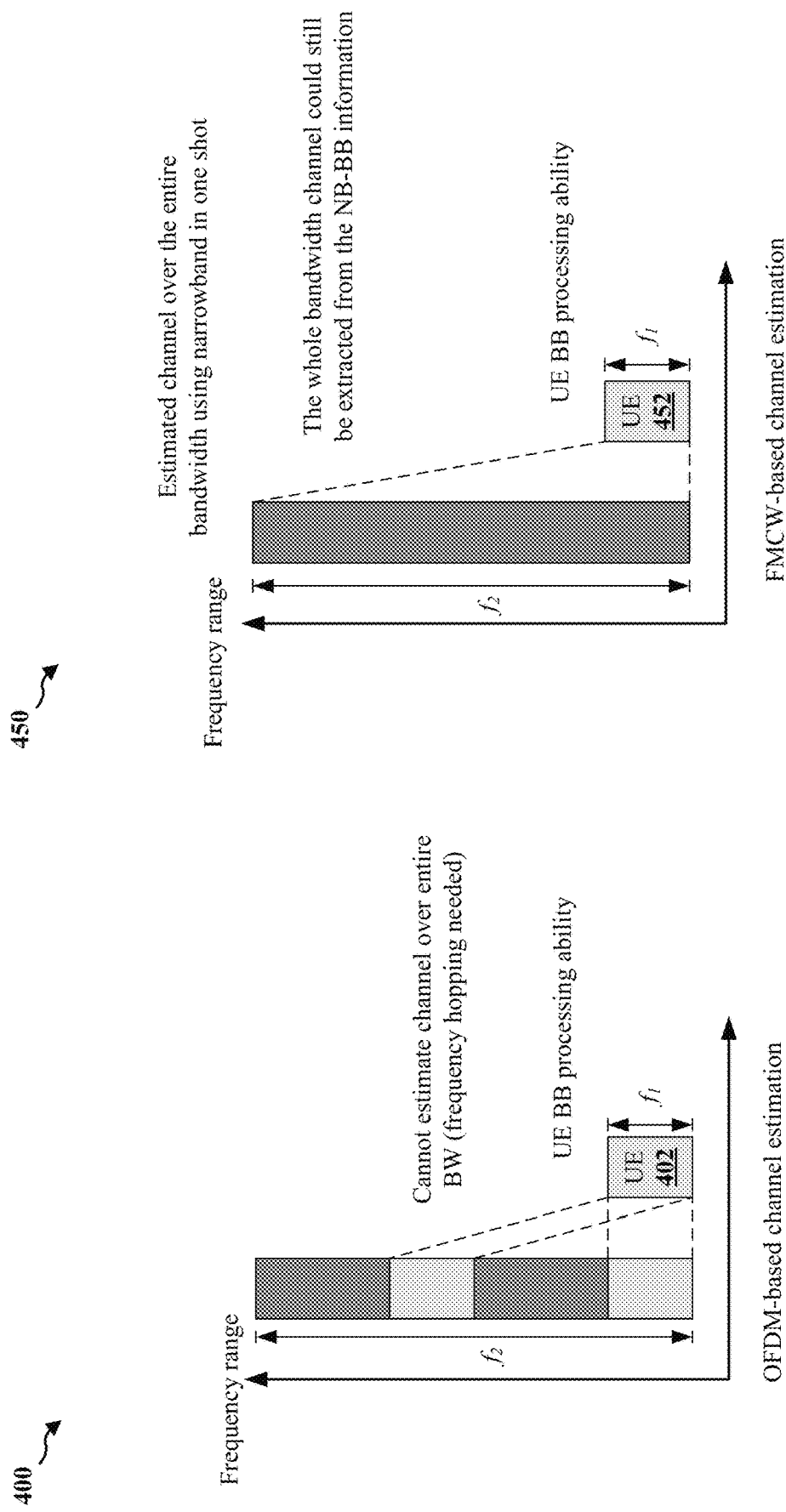
FIG. 4A is a diagram illustrating an example of OFDM-based channel estimation.
FIG. 4B is a diagram illustrating an example of FMCW-based channel estimation.

An FMCW signal (or an FMCW transmission) may refer to a continuous wave with a changing frequency. The frequency of the FMCW signal may be modulated or swept within a specific frequency range (e.g., from a lower frequency to a higher frequency) in a continuous manner. An FMCW signal may be used as a DL wideband (WB) channel sounding reference signal and can have various applications for wideband channel estimation. For example, an FMCW-based DL WB channel sounding reference signal may be used for channel estimation with wide system bandwidths, such as bandwidths ranging from 400 MHz up to 8 GHz for FR3, 6 GHZ, and sub-terahertz frequencies. Some mid-tier UE and Internet of Things (IoT) devices may not fully support the system's full bandwidth spectrum. For example, these devices might support bandwidths such as 20 MHz, 100 MHz, 400 MHz, or 1 GHz. FIG. 4A is a diagram 400 illustrating an example of OFDM-based channel estimation. In FIG. 4A, due to limited baseband (BB) processing capability (e.g., the UE 402 may support a limited frequency band $f_1$), the UE 402 may not directly estimate the channel over the entire bandwidth $f_2$. The UE 402 may use, for example, frequency hopping technique to estimate the channel over the entire bandwidth $f_2$. FIG. 4B is a diagram 450 illustrating an example of FMCW-based channel estimation. In FIG. 4B, the UE 452, with a narrow band (e.g., $f_1$) BB processing capability, may estimate a wide band channel over the entire bandwidth (e.g., $f_2$) using the narrow band (e.g., $f_1$) in one run, and the whole bandwidth channel may be extracted from the narrow band baseband information.

Figure 5:
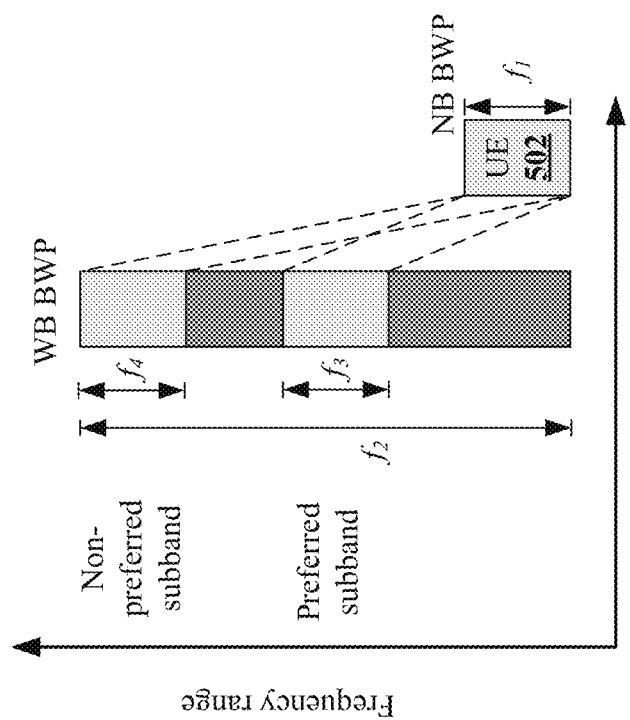
FIG. 5 is a diagram illustrating an example of identifying preferred sub-bands in FMCW-based channel estimation.

Wideband channel estimation enables the UE to scan a large bandwidth and identify one or more sub-bands. This large-scale scanning provides a comprehensive view of the available spectrum, allowing the UE to select the most suitable sub-bands for its specific use case and performance requirements. In addition, from the network perspective, the same resource efficiency may apply for UE-specific narrow-band bandwidth part (NB BWP) allocation. FIG. 5 is a diagram 500 illustrates an example of identifying preferred sub-bands in FMCW-based channel estimation. In FIG. 5, the UE 502 with a narrow band (e.g., $f_1$) BB processing capability may estimate a wide band channel over the entire bandwidth (e.g., $f_2$). Based on the estimation over the entire bandwidth (e.g., $f_2$), the UE may identify the preferred-subband (e.g., $f_3$) and non-preferred subband (e.g., $f_4$). The preferred and non-preferred subbands may be identified based on the characteristics of the subbands (e.g., the channel gain over the subbands).

Figure 6:
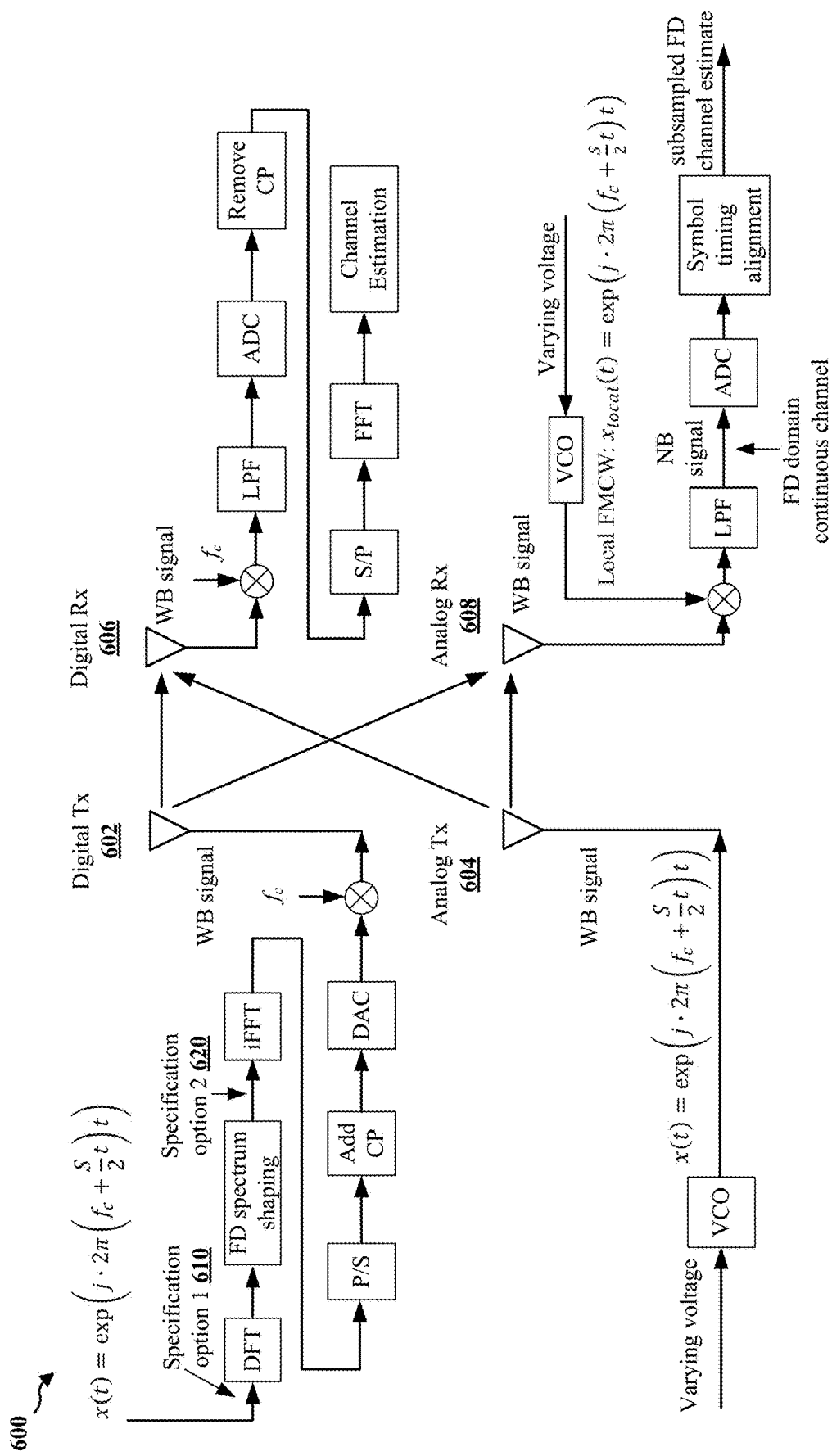
FIG. 6 is a diagram illustrating examples of wideband channel estimation.

FIG. 6 is a diagram 600 illustrating examples of wideband channel estimation. In FIG. 6, on the transmitter side, the FMCW signal (e.g., x(t)) may be transmitted by either a digital transmitter (602) or an analog transmitter (604). When transmitting using the digital transmitter 602, for the specification definition, the FMCW signal may be regarded as a time domain sequence (e.g., at specification option 1 610) or a frequency domain sequence (e.g., at specification option 2 620). On the receiver side, the FMCW signal may be received by either a digital receiver (606) or an analog receiver (608).

In comparison to digital Rx processing, the analog FMCW Rx processing has a lower ADC rate, resulting in the benefits in cost-saving and power efficiency. As an example, as the frequency domain (FD) channel estimate resolution decreases, the requirement for the ADC similarly reduces, leading to substantial cost savings. Additionally, there is a potential power benefit when measuring the wideband channel using a narrowband baseband (NB BB) chain. Table 2 shows a comparison of sampling rate/ADC requirement under different BWs and SCSs. As shown in Table 2, using an analog receiver may reduce the required sampling rate (e.g., the sampling rate using an analog receiver is 6.67% of that using the digital receiver).

TABLE 2

Comparison of sampling rate/ADC requirement under different BWs and SCSs

| BW/SCS | Samples per symbols with digital Rx | Sampling rate/ADC requirement with digital Rx | Sampling rate/ADC requirement with analog Rx (per-RB channel estimation granularity) |
| --- | --- | --- | --- |
| 100 MHz, 30 KHz | 4096 | 122.88 MHz | 8.19 MHz |
| 400 MHz, 30 KHz | 16384 | 491.52 MHz | 32.76 MHz |
| 400 MHz, 120 KHz | 4096 | 491.52 MHz | 32.76 MHz |
| 1600 MHz, 120 KHz | 16384 | 1966.08 MHz | 131.04 MHz |
| ADC comparison | | | 6.67% of digital Rx |

Some ADC processes use the FMCW receive (Rx) architecture for wideband channel estimation in wireless communication systems. The ADC sampling rate requirement may be calculated as $$ADC\ \text{rate} = \frac{S}{BW_{subband}} = \frac{BW_{wideband} \cdot \Delta f}{BW_{subband}} \quad (1)$$

where S is the slope of the FMCW, $BW_{wideband}$ is the overall bandwidth the FMCW occupies, $\Delta f$ represents the Subcarrier Spacing (SCS), and $1/\Delta f$ is the overall time duration the FMCW occupies. $BW_{subband}$ denotes the channel granularity for wideband channel estimation.

For a specific UE with a maximum supported ADC sampling rate, the channel granularity is proportional to the overall bandwidth that the FMCW occupies. Hence, a larger $BW_{wideband}$ may be beneficial for the receiver to scan a wideband for channel estimation. On the other hand, a smaller $BW_{wideband}$ may be beneficial for better channel granularity.

Example aspects presented herein provide a two-step FMCW scheme for enhancing channel measurement accuracy. First, an FMCW with a larger $BW_{wideband}$ may be transmitted. Following the first transmission, an FMCW with a smaller $BW_{wideband}$ may be transmitted. This two-step approach enables both a broad scan of the wideband for channel estimation and enables better channel granularity for the channel estimation.

In some aspects, in the first transmission, an FMCW with a larger overall bandwidth (e.g., $BW_{wideband}$) is transmitted. A large $BW_{wideband}$ may be beneficial for the receiver (Rx) to scan a wideband for channel estimation. The FMCW with a larger $BW_{wideband}$ may be transmitted in a periodic or an aperiodic manner, and the FMCW may be transmitted by either the network (NW) or the UE.

In some aspects, in the second transmission, an FMCW with a smaller $BW_{wideband}$ may be transmitted. A small $BW_{wideband}$ may be advantageous for achieving better granularity in the channel estimation. For example, if $BW_{wideband}$ equals 1 GHz in the first transmission, the receiver (Rx) may estimate the channel with a granularity of 10 RBs. If $BW_{wideband}$ equals 100 MHz in the second transmission, the receiver may estimate the channel with a granularity of 1 RB. A same Analog-to-Digital Converter (ADC) requirement may be used for the first and second transmissions.

In some aspects, the frequency location of the second FMCW with a small $BW_{wideband}$ may be based on at least the transmission of the FMCW with a large $BW_{wideband}$ in the first transmission.

Like the FMCW with a larger $BW_{wideband}$, the FMCW with a smaller $BW_{wideband}$ may also be transmitted in a periodic or an aperiodic manner and may be transmitted by either the NW or the UE. Detailed aspects of this two-step FMCW transmission scheme, along with specific use cases, will be elaborated in the following sections.

Figure 7:
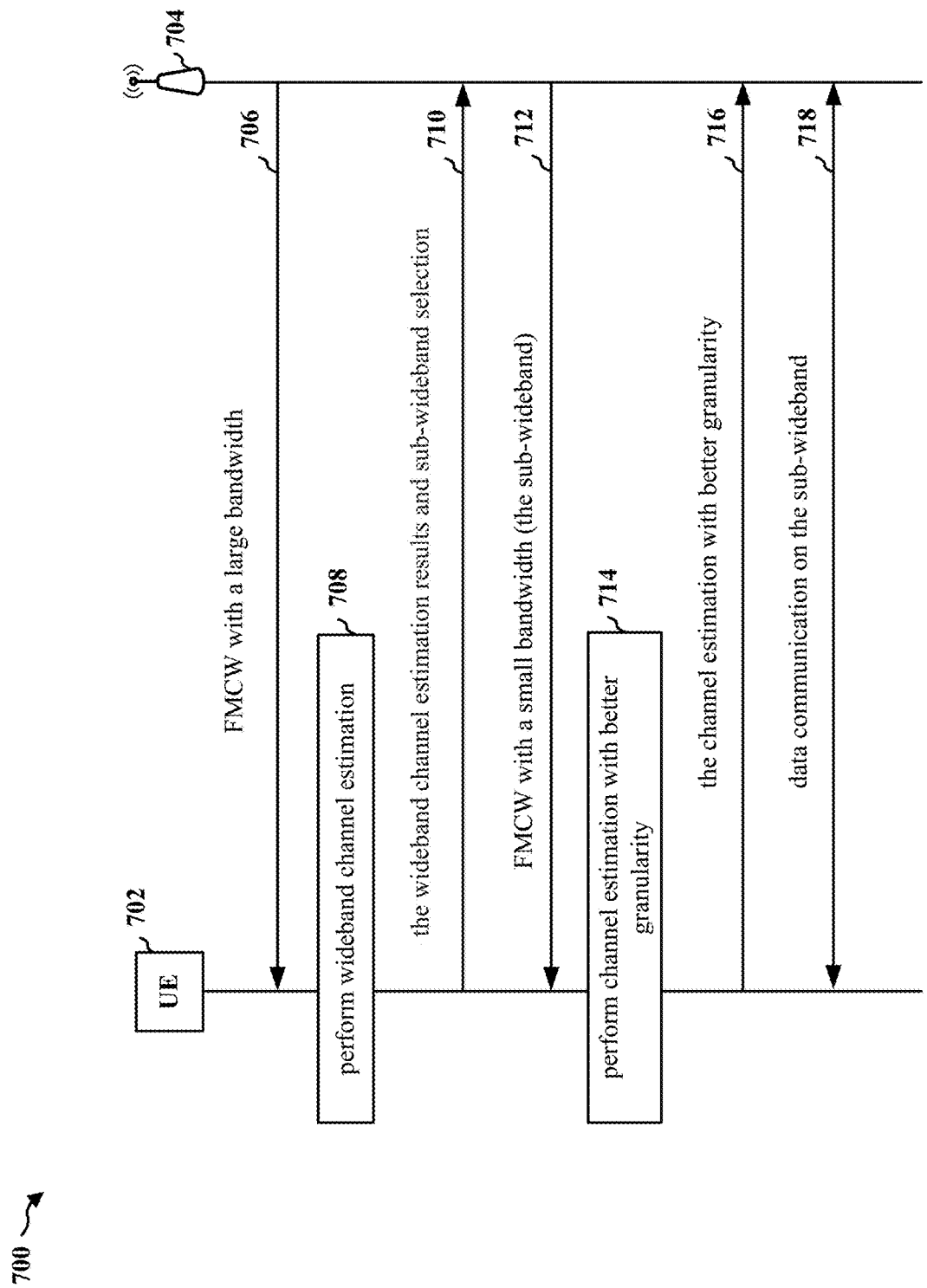
FIG. 7 is a call flow diagram illustrating a method of wireless communication in accordance with various aspects of the present disclosure.

FIG. 7 is a call flow diagram 700 illustrating a method of wireless communication in accordance with various aspects of this present disclosure. Various aspects are described in connection with a UE 702 and a base station 704. The UE may be the UE 104, 350, or the apparatus 1404 in the hardware implementation of FIG. 14. The base station may be the base station 102, 310. Although aspects are described as being performed by the base station 704, the aspects may be performed by a base station in aggregation or by one or more disaggregated components of a base station or network node, such as a CU 110, DU 130, or RU 140. The aspects presented in the communication flow enable improves to channel estimation through multiple FMCW transmissions using different bandwidths.

In FIG. 7, at 706, the base station 704 may transmit an FMCW (the first FMCW) with a large bandwidth to the UE 702.

At 708, the UE 702 may receive the first FMCW and perform a wideband channel estimation based on the first FMCW. The UE may identify or select a sub-wideband bandwidth, e.g., a frequency range with a bandwidth smaller than the wideband, based on the channel estimation.

At 710, the UE 702 may transmit the wideband channel estimation result and a sub-wideband selection, or other information that enables the base station to identify a sub-wideband, to the base station 704.

At 712, the base station 704 may transmit an FMCW (the second FMCW) with a small bandwidth (the sub-wideband) to the UE 702. The smaller bandwidth may be based on the sub-wideband selection, or identification, received at 710.

At 714, the UE 702 may receive the second FMCW and perform channel estimation based on the second FMCW. The channel estimation based on the second FMCW has more granularity than the channel estimation based on the first FMCW.

At 716, the UE 702 may transmit the channel estimation with the added granularity to the base station 704. The channel estimation based on the second FMCW enables the base station to identify a sub-wideband to use for communication with the UE.

At 718, the UE 702 and the base station 704 may communicate with each other, e.g., transmit and receive communication, on the sub-wideband bandwidth (e.g., a bandwidth that is less than the wideband) identified through the two-step FMCW channel estimation.

In the example of FIG. 7, the network (e.g., the base station 704 or a component of the base station) provides the multiple FMCW transmission. In the first transmission, the base station 704 transmits an FMCW with a larger overall bandwidth ($BW_{wideband}$), enabling the receiver (Rx) to perform a broad scan for channel estimation. Subsequently, in the second transmission, the network (e.g., the base station 704) transmits an FMCW with a smaller $BW_{wideband}$. This step enhances the granularity of channel estimation, thus allowing for more detailed and accurate channel estimation.

Figure 8:
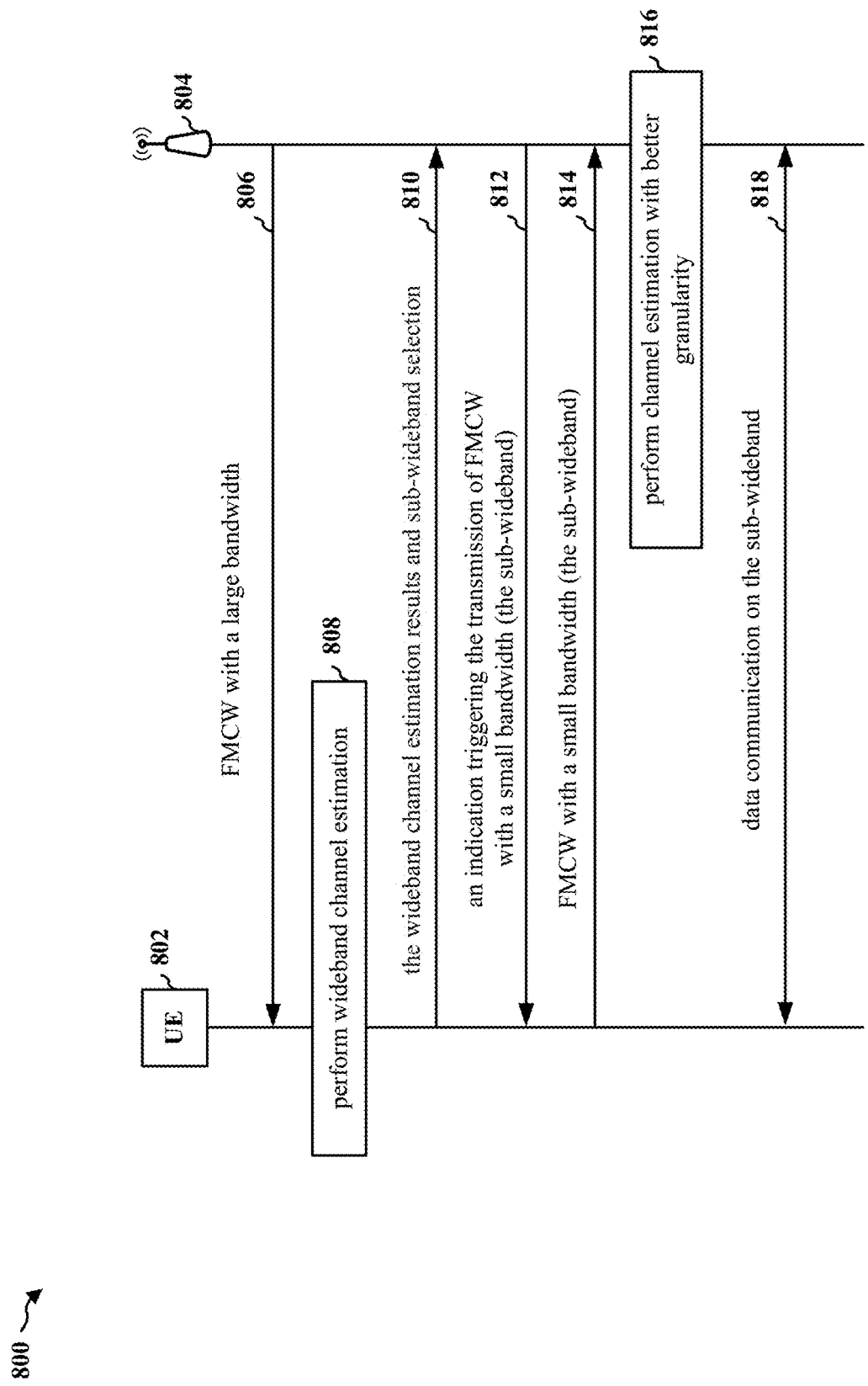
FIG. 8 is a call flow diagram illustrating a method of wireless communication in accordance with various aspects of the present disclosure.

FIG. 8 is a call flow diagram 800 illustrating a method of wireless communication in accordance with various aspects of this present disclosure. Various aspects are described in connection with a UE 802 and a base station 804. The UE may be the UE 104, 350, or the apparatus 1404 in the hardware implementation of FIG. 14. The base station may be the base station 102, 310 or the network entity 1502 in FIG. 15. Although aspects are described as being performed by the base station 704, the aspects may be performed by a base station in aggregation or by one or more disaggregated components of a base station or network node, such as a CU 110, DU 130, or RU 140. The aspects presented in the communication flow enable improves to channel estimation through multiple FMCW transmissions using different bandwidths.

In FIG. 8, at 806, the base station 804 may transmit an FMCW with a large bandwidth (the first FMCW) to the UE 802.

At 808, the UE 802 may receive the FMCW and perform a wideband channel estimation based on the first FMCW. The UE may identify or select a sub-wideband bandwidth, e.g., a frequency range with a bandwidth smaller than the wideband, based on the channel estimation.

At 810, the UE 802 may transmit the wideband channel estimation result and a sub-wideband selection, or other information that enables the base station to identify a sub-wideband, to the base station 804.

At 812, the base station 804 may transmit to the UE 802 an indication triggering the transmission of an FMCW (i.e., the second FMCW) with a smaller bandwidth (e.g., the sub-wideband).

In 814, the UE 802 may, in response to the indication, transmit an FMCW (the second FMCW) with a small bandwidth (the sub-wideband) to the base station 804.

At 816, the base station 804 may receive the second FMCW and perform a channel estimation based on the second FMCW. The channel estimation by the base station based on the second FMCW has more granularity than the channel estimation based on the first FMCW because of the smaller bandwidth of the second FMCW.

At 818, the UE 802 and the base station 804 may communicate with each other, e.g., transmit and receive communication, on the sub-wideband bandwidth (e.g., a bandwidth that is less than the wideband) identified through the two-step FMCW channel estimation.

In the example of FIG. 8, the first FMCW transmission is conducted by the network (e.g., the base station 804), allowing the receiver (Rx) to perform a broad scan for channel estimation. Subsequently, the network indicates the UE to transmit a second FMCW transmission with a smaller $BW_{wideband}$. The transmission of the FMCW with a smaller $BW_{wideband}$ by the UE increases the granularity of channel estimation, thus allowing for more accurate channel estimation.

Figure 9:
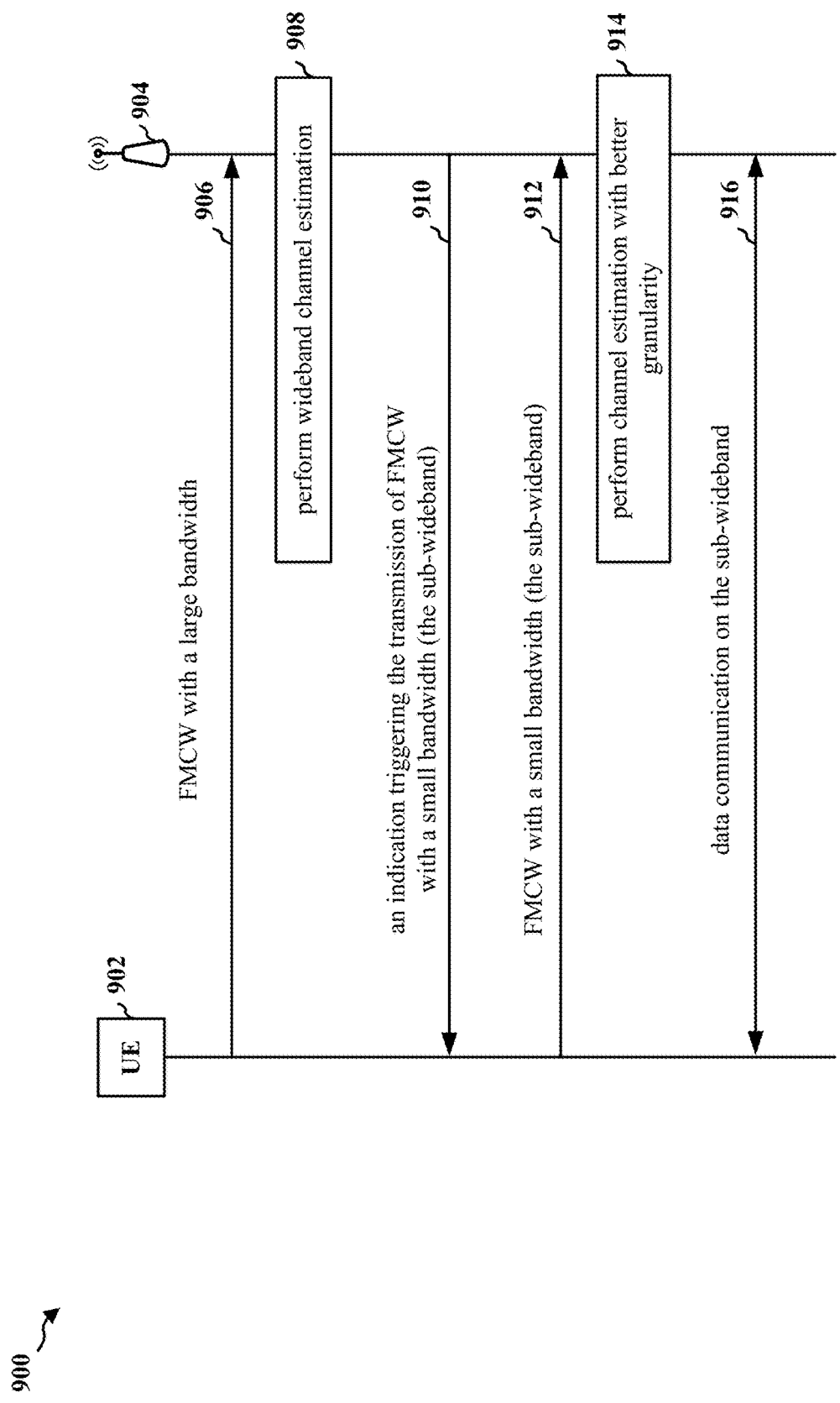
FIG. 9 is a call flow diagram illustrating a method of wireless communication in accordance with various aspects of the present disclosure.

FIG. 9 is a call flow diagram 900 illustrating a method of wireless communication in accordance with various aspects of this present disclosure. Various aspects are described in connection with a UE 902 and a base station 904. The UE may be the UE 104, 350, or the apparatus 1404 in the hardware implementation of FIG. 14. The base station may be the base station 102, 310 or the network entity 1502 in FIG. 15. Although aspects are described as being performed by the base station 704, the aspects may be performed by a base station in aggregation or by one or more disaggregated components of a base station or network node, such as a CU 110, DU 130, or RU 140. The aspects presented in the communication flow enable improves to channel estimation through multiple FMCW transmissions using different bandwidths.

In FIG. 9, at 906, the UE 902 may transmit an FMCW (the first FMCW) with a large bandwidth to the base station 904.

At 908, the base station 904 may receive the FMCW and perform a wideband channel estimation based on the first FMCW. The base station may identify or select a sub-wideband bandwidth, e.g., a frequency range with a bandwidth smaller than the wideband, based on the channel estimation.

At 910, the base station 904 may transmit an indication triggering the transmission of FMCW (the second FMCW) with a small bandwidth (e.g., the sub-wideband) to the base station 904.

At 912, the UE 902 may, in response to the indication, transmit to the base station 904 an FMCW (the second FMCW) with a small bandwidth (the sub-wideband).

At 914, the base station 904 may perform a channel estimation with more granularity based on the second FMCW.

At 916, the UE 902 and the base station 904 may communicate with each other, e.g., transmit and receive communication, on the sub-wideband bandwidth.

In the example of FIG. 9, the network (e.g., the base station 904) may indicate the UE 902 to conduct both steps of the FMCW transmission. In the first step, the UE 902 may be indicated by the network to transmit an FMCW with a large overall bandwidth (e.g., $BW_{wideband}$). If the UE's baseband capability is less than the whole wideband, an analog transmission may be used for the FMCW transmission. This transmission with a large $BW_{wideband}$ allows for a broad scan for channel estimation. For the second step, the network (e.g., the base station 904) may further indicate the UE 902 to transmit an FMCW with a smaller $BW_{wideband}$. This step enhances the granularity of channel estimation, thus allowing for more detailed and accurate channel estimation.

Figure 10:
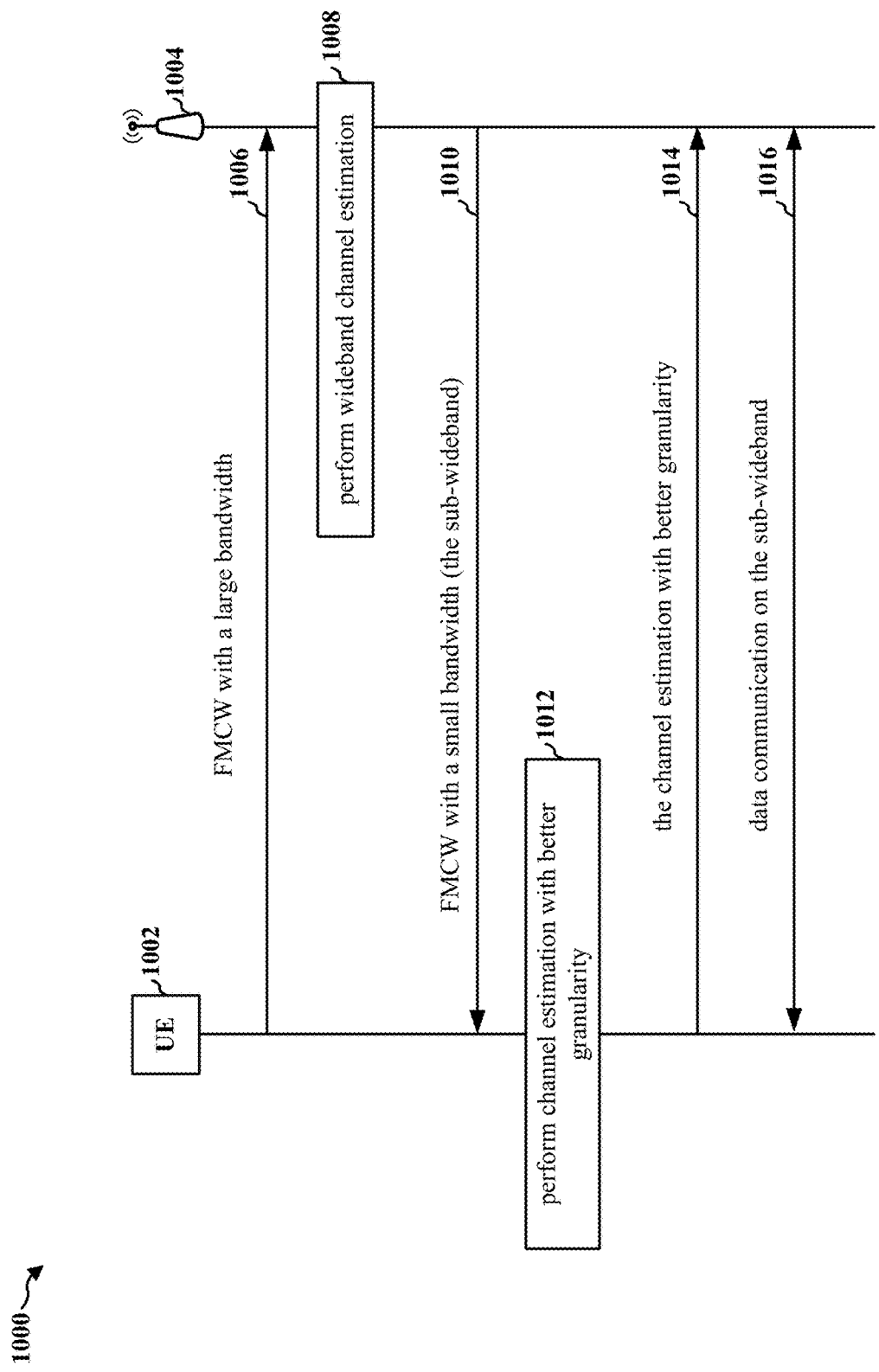
FIG. 10 is a call flow diagram illustrating a method of wireless communication in accordance with various aspects of the present disclosure.

FIG. 10 is a call flow diagram 1000 illustrating a method of wireless communication in accordance with various aspects of this present disclosure. Various aspects are described in connection with a UE 1002 and a base station 1004. The UE may be the UE 104, 350, or the apparatus 1404 in the hardware implementation of FIG. 14. The base station may be base station 102, 310 or the network entity 1502 in FIG. 15. Although aspects are described as being performed by the base station 704, the aspects may be performed by a base station in aggregation or by one or more disaggregated components of a base station or network node, such as a CU 110, DU 130, or RU 140. The aspects presented in the communication flow enable improves to channel estimation through multiple FMCW transmissions using different bandwidths.

In FIG. 10, at 1006, the UE 1002 may transmit an FMCW (the first FMCW) with a large bandwidth to the base station 1004.

At 1008, the base station 1004 may perform wideband channel estimation based on the first FMCW.

At 1010, the base station 1004 may transmit an FMCW (the second FMCW) with a small bandwidth (e.g., the sub-wideband) to the UE 1002.

At 1012, the UE 1002 may perform channel estimation with better granularity based on the second FMCW.

At 1014, the UE 1002 may transmit the channel estimation with better granularity to the base station 1004.

At 1016, the UE 1002 and the base station 904 may communicate with each other, e.g., transmit and receive, on the sub-wideband.

In the example of FIG. 10, the UE 1002 may first be indicated by the network (e.g., the base station 1004) to transmit an FMCW (the first FMCW) with a large overall bandwidth ($BW_{wideband}$). If the baseband capability of the UE 1002 is less than the total wideband, an analog transmission may be employed for the FMCW transmission. This transmission with a larger $BW_{wideband}$ allows for a broad scan for channel estimation. The network (e.g., the base station 1004) may then transmit an FMCW (the second FMCW) with a smaller $BW_{wideband}$. This increases the granularity of channel estimation, thus allowing for more detailed and accurate channel estimation.

In the two-step FMCW transmission, the selection of the sub-wideband for the flatter, second FMCW transmission may be influenced by several criteria.

In a first example criterion, the selection of the sub-wideband using the second FMCW transmission may be based on the frequency location exhibiting better channel gain. This criterion may be applicable where the baseband capability of the UE is less than the wideband, and the subsequent data communications may be executed in the sub-wideband.

In a second example criterion, the selection of the sub-wideband using the second FMCW transmission may be based on the frequency location exhibiting fast channel variation. This criterion may be applicable where the baseband capability of the UE is equal to the wideband. In such a scenario, more accurate channel estimation results (e.g., with better channel granularity) may be desired in the sub-wideband. This is because a large channel granularity may not capture frequency domain (FD) channel variation.

Figure 11:
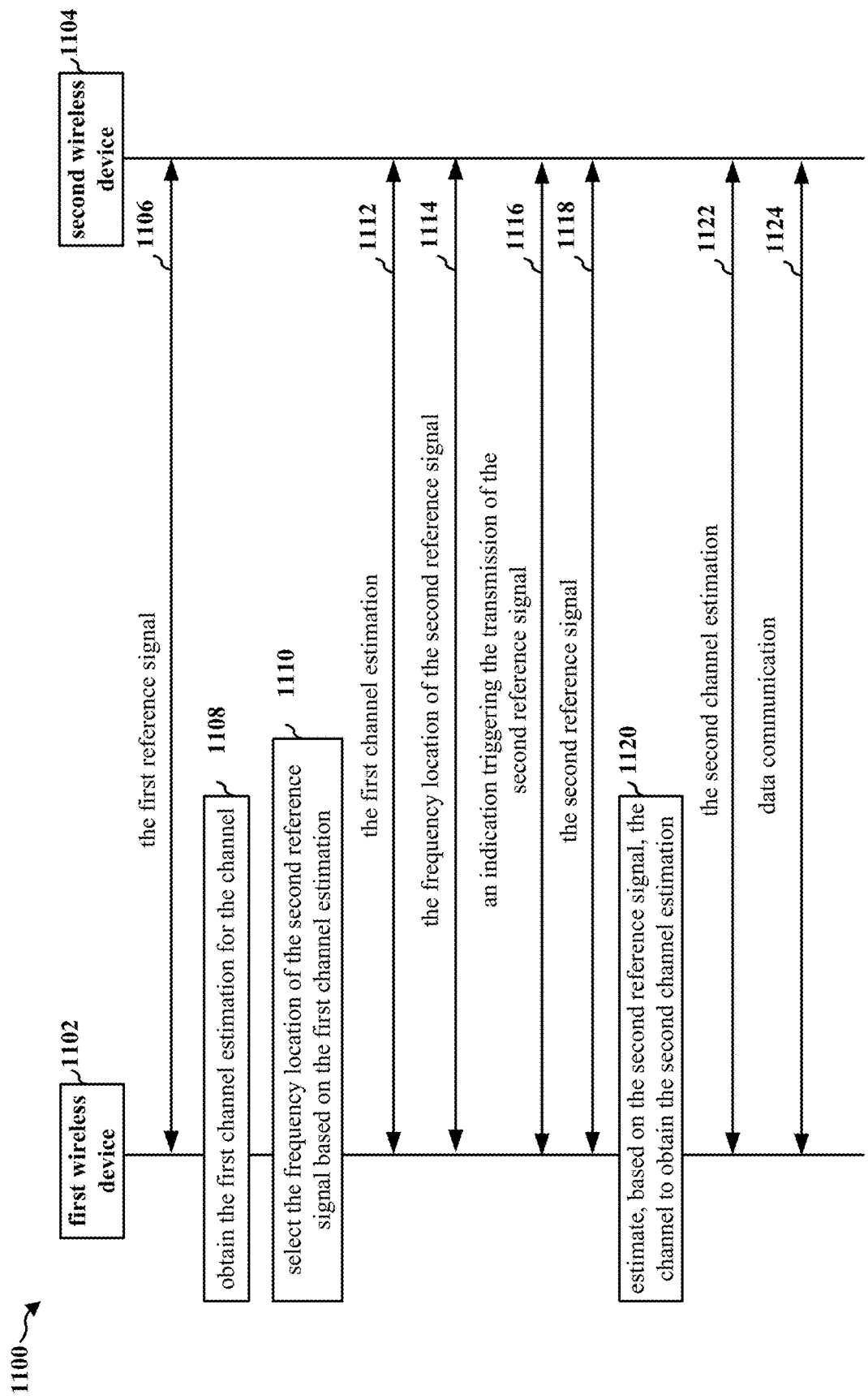
FIG. 11 is a call flow diagram illustrating a method of wireless communication in accordance with various aspects of the present disclosure.

FIG. 11 is a call flow diagram 1100 illustrating a method of wireless communication in accordance with various aspects of this present disclosure. Various aspects are described in connection with a first wireless device 1102 and a second wireless device 1104. The aspects may be performed by the first wireless device 1102 or the second wireless device 1104. In some examples, the first wireless device 1102 may be a UE, and the second wireless device 1104 may be a base station. In some examples, the first wireless device 1102 may be a base station, and the second wireless device 1104 may be a UE. The base station may be the base station 102, 310 or the network entity 1502 in FIG. 15. Although aspects are described as being performed by the base station 704, the aspects may be performed by a base station in aggregation or by one or more disaggregated components of a base station or network node, such as a CU 110, DU 130, or RU 140. The aspects presented in the communication flow enable improves to channel estimation through multiple FMCW transmissions using different bandwidths.

As shown in FIG. 11, a first wireless device 1102 may communicate a first reference signal with the second wireless device 1104. The first reference signal based on the first FMCW and may have a first frequency bandwidth occupied by the first FMCW. To communicate the first reference signal with the second wireless device 1104, in some examples, the first wireless device 1102 may transmit the first reference signal to the second wireless device 1104, and, in some examples, the first wireless device 1102 may receive the first reference signal from the second wireless device 1104. For example, referring to FIG. 7, a first wireless device (the UE 702) may communicate a first reference signal (an FMCW with a large bandwidth) with the second wireless device (the base station 704). Referring to FIG. 9, a first wireless device (the UE 902) may communicate a first reference signal (an FMCW with a large bandwidth) with the second wireless device (the base station 904).

At 1108, the first wireless device 1102 may obtain the first channel estimation for the channel between the first wireless device 1102 and the second wireless device 1104. For example, referring to FIG. 7, the first wireless device (the UE 702) may, at 708, perform wideband channel estimation to obtain the first channel estimation for the channel between the first wireless device (the UE 702) and the second wireless device (the base station 704).

At 1110, the first wireless device 1102 may select the frequency location of the second reference signal based on the first channel estimation.

At 1112, the first wireless device 1102 may communicate the first channel estimation to the second wireless device 1104. In some examples, referring to FIG. 7, the first wireless device (the UE 702) may receive, at 706, the first reference signal (the FMCW with a large bandwidth) from the second wireless device (the base station 704), obtain the first channel estimation (perform wideband channel estimation at 708), and then transmit, at 710, the first channel estimation (e.g., the wideband channel estimation) to the second wireless device (the base station 704).

At 1114, the first wireless device 1102 may transmit to, or receive from, the second wireless device 1104, the frequency location of the second reference signal. For example, referring to FIG. 7, the first wireless device (the UE 702) may transmit, at 710, the frequency location of the second reference signal (the sub-wideband selection) to the second wireless device (the base station 704).

At 1116, the first wireless device 1102 may transmit to, or receive from, the second wireless device 1104 an indication triggering the transmission of the second reference signal. For example, referring to FIG. 9, the first wireless device (the UE 902) may receive, at 910, from the second wireless device (the base station 904) an indication triggering the transmission of the second reference signal (an FMCW with a small bandwidth).

At 1118, the first wireless device 1102 may transmit to, or receive from, the second wireless device 1104 the second reference signal. For example, referring to FIG. 7, the first wireless device (the UE 702) may receive, at 712, from the second wireless device (the base station 704) the second reference signal (an FMCW with a small bandwidth). Referring to FIG. 8, the first wireless device (the UE 802) may transmit, at 814, to the second wireless device (the base station 804) the second reference signal (an FMCW with a small bandwidth).

In some aspects, at 1120, the first wireless device 1102 may estimate the channel based on the second reference signal to obtain the second channel estimation. For example, referring to FIG. 7, the first wireless device (the UE 702) may, at 714, perform channel estimation with better granularity based on the second reference signal (an FMCW with a small bandwidth).

At 1122, the first wireless device 1102 may transmit to, or receive from, the second wireless device 1104 the second channel estimation. For example, referring to FIG. 7, the first wireless device (the UE 702) may transmit, at 716, to the second wireless device (the base station 704) the second channel estimation (the channel estimation with better granularity).

At 1124, the first wireless device 1102 may communicate with the second wireless device 1104. For example, referring to FIG. 7, the first wireless device (the UE 702) may transmit data to, or receive data from, the second wireless device (the base station 704).

Figure 12:
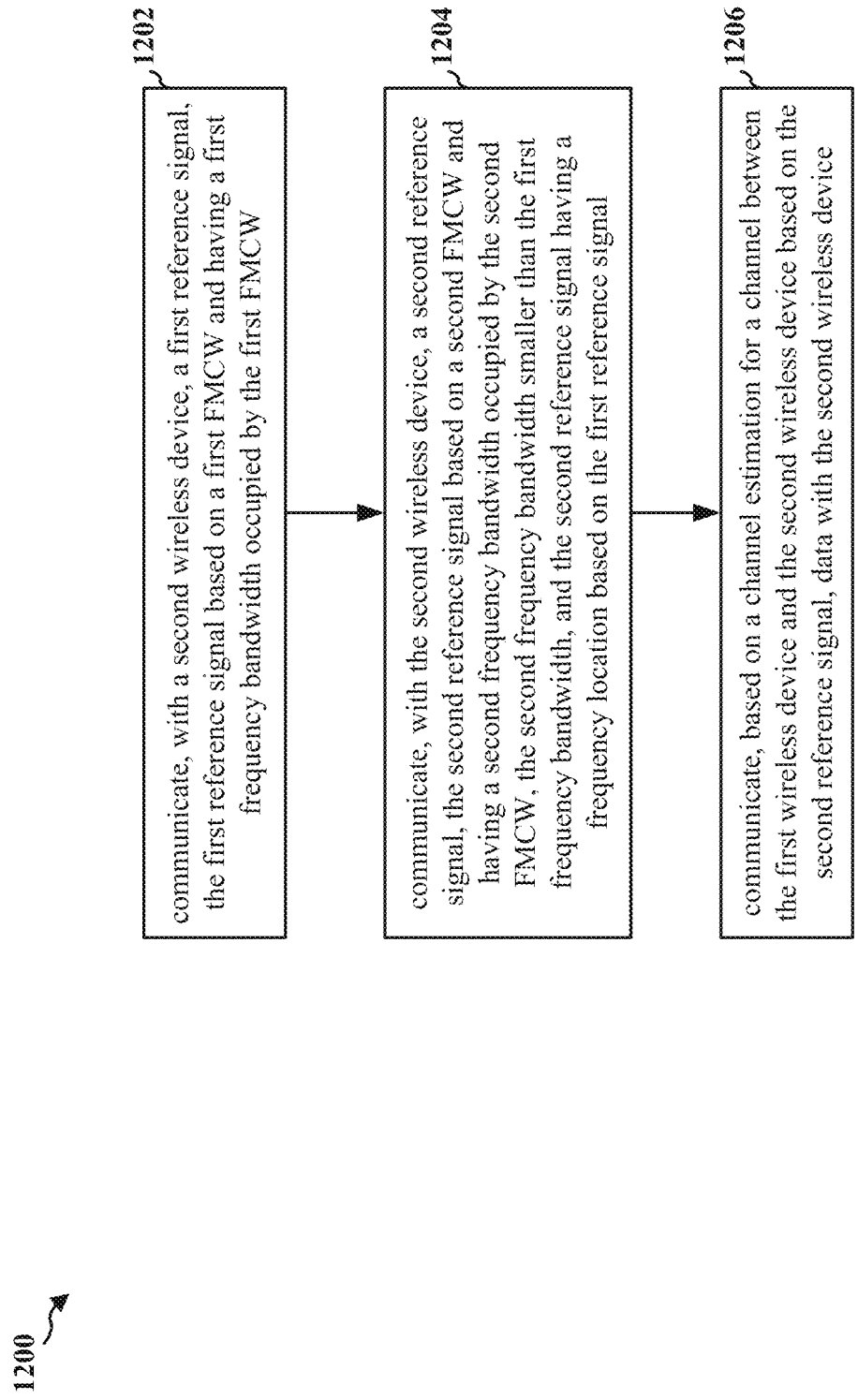
FIG. 12 is a flowchart illustrating methods of wireless communication at a first wireless device in accordance with various aspects of the present disclosure.

FIG. 12 is a flowchart 1200 illustrating methods of wireless communication at a first wireless device in accordance with various aspects of the present disclosure. The method may be performed by the first wireless device. In some examples, the first wireless device may be a UE. The UE may be the UE 104, 350, 702, 802, 902, 1002, or the apparatus 1404 in the hardware implementation of FIG. 14. In some examples, the first wireless device may be a network node. The network node may be a base station, or a component of a base station, in the access network of FIG. 1 or a core network component (e.g., base station 102, 310, 704, 804, 904, 1004; or the network entity 1402 in the hardware implementation of FIG. 14). The method involves a two-step FMCW-based approach for wideband channel estimation. The two-step approach allows for flexible control over the bandwidth being used for channel estimation and is applicable for different devices and use cases, such as mid-tier or IoT devices that may not support the full system bandwidth. This method allows both the network and the UE to efficiently allocate resources, as both can scan larger bandwidths to identify preferred sub-bands, and can be fine-tuned to specific channel conditions, improving the channel estimation accuracy.

As shown in FIG. 12, at 1202, the first wireless device may communicate a first reference signal with a second wireless device. The first reference signal may be based on a first FMCW and may have a first frequency bandwidth occupied by the first FMCW. In the examples the first wireless device is a UE, the second wireless device may be a network node. The network node may be a base station, or a component of a base station, in the access network of FIG. 1 or a core network component (e.g., base station 102, 310, 704, 804, 904, 1004; or the network entity 1402 in the hardware implementation of FIG. 14). In the examples of the first wireless device is a network node, the second wireless device may be a UE. The UE may be the UE 104, 350, 702, 802, 902, 1002, or the apparatus 1404 in the hardware implementation of FIG. 14. FIGS. 7, 8, 9, 10, and 11 illustrate various aspects of the steps in connection with flowchart 1200. For example, referring to FIG. 11, the first wireless device 1102 may communicate, at 1106, a first reference signal with a second wireless device 1104. Referring to FIG. 7, a first wireless device (the UE 702) may receive a first reference signal (an FMCW with a large bandwidth) from the second wireless device (the base station 704). Referring to FIG. 9, a first wireless device (the UE 902) may transmit a first reference signal (an FMCW with a large bandwidth) to the second wireless device (the base station 904). In some aspects, 1202 may be performed by the channel measurement component 198 or the channel measurement component 199.

At 1204, the first wireless device may communicate a second reference signal with the second wireless device. The second reference signal may be based on a second FMCW and may have a second frequency bandwidth occupied by the second FMCW. The second frequency bandwidth may be smaller than the first frequency bandwidth, and the second reference signal may have a frequency location based on the first reference signal. For example, referring to FIG. 11, the first wireless device 1102 may communicate, at 1118, a second reference signal with the second wireless device 1104. Referring to FIG. 7, the first wireless device (the UE 702) may receive, at 712, from the second wireless device (the base station 704), the second reference signal (an FMCW with a small bandwidth). Referring to FIG. 8, the first wireless device (the UE 802) may transmit, at 814, to the second wireless device (the base station 804) the second reference signal (an FMCW with a small bandwidth). In some aspects, 1204 may be performed by the channel measurement component 198 or the channel measurement component 199.

At 1206, the first wireless device may communicate, based on a channel estimation for a channel between the first wireless device and the second wireless device based on the second reference signal, data with the second wireless device. For example, referring to FIG. 11, the first wireless device 1102 may communicate, at 1124, based on a channel estimation for a channel between the first wireless device 1102 and the second wireless device 1104, data with the second wireless device 1104. In some aspects, 1206 may be performed by the channel measurement component 198 or the channel measurement component 199.

Figure 13:
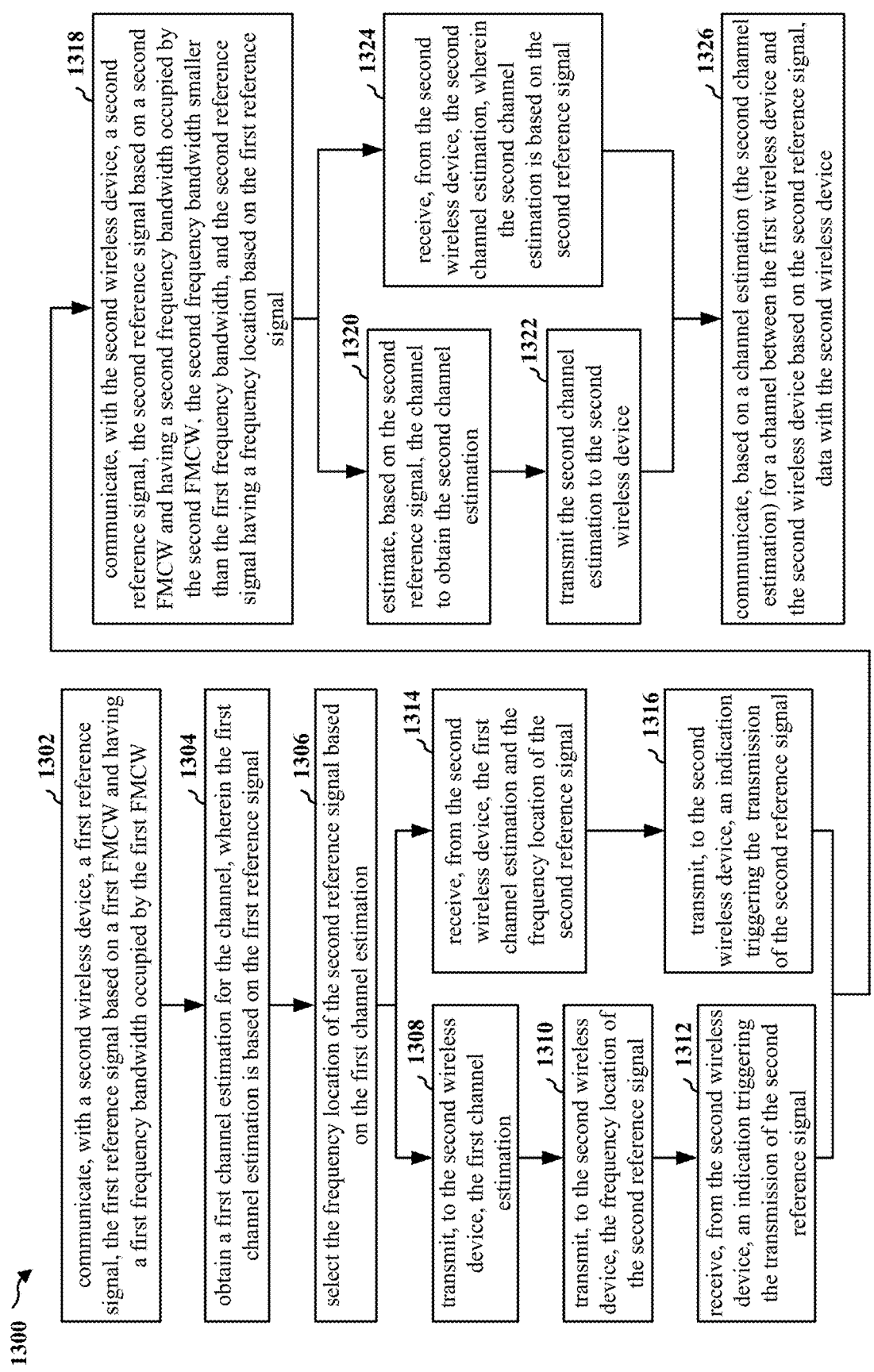
FIG. 13 is a flowchart illustrating methods of wireless communication at a first wireless device in accordance with various aspects of the present disclosure.

FIG. 13 is a flowchart 1300 illustrating methods of wireless communication at a first wireless device in accordance with various aspects of the present disclosure. The method may be performed by the first wireless device. In some examples, the first wireless device may be a UE. The UE may be the UE 104, 350, 702, 802, 902, 1002, or the apparatus 1404 in the hardware implementation of FIG. 14. In some examples, the first wireless device may be a network node. The network node may be a base station, or a component of a base station, in the access network of FIG. 1 or a core network component (e.g., base station 102, 310, 704, 804, 904, 1004; or the network entity 1402 in the hardware implementation of FIG. 14). The method involves a two-step FMCW-based approach for wideband channel estimation. The two-step approach allows for flexible control over the bandwidth being used for channel estimation and is applicable for different devices and use cases, such as mid-tier or IoT devices that may not support the full system bandwidth. This method allows both the network and the UE to efficiently allocate resources, as both can scan larger bandwidths to identify preferred sub-bands, and can be fine-tuned to specific channel conditions, improving the channel estimation accuracy.

As shown in FIG. 13, at 1302, the first wireless device may communicate a first reference signal with a second wireless device. The first reference signal may be based on a first FMCW and may have a first frequency bandwidth occupied by the first FMCW. In the examples the first wireless device is a UE, the second wireless device may be a network node. The network node may be a base station, or a component of a base station, in the access network of FIG. 1 or a core network component (e.g., base station 102, 310, 704, 804, 904, 1004; or the network entity 1402 in the hardware implementation of FIG. 14). In the examples of the first wireless device is a network node, the second wireless device may be a UE. The UE may be the UE 104, 350, 702, 802, 902, 1002, or the apparatus 1404 in the hardware implementation of FIG. 14. FIGS. 7, 8, 9, 10, and 11 illustrate various aspects of the steps in connection with flowchart 1300. For example, referring to FIG. 11, the first wireless device 1102 may communicate, at 1106, a first reference signal with a second wireless device 1104. Referring to FIG. 7, a first wireless device (the UE 702) may receive a first reference signal (an FMCW with a large bandwidth) from the second wireless device (the base station 704). Referring to FIG. 9, a first wireless device (the UE 902) may transmit a first reference signal (an FMCW with a large bandwidth) to the second wireless device (the base station 904). In some aspects, 1302 may be performed by the channel measurement component 198 or the channel measurement component 199.

At 1318, the first wireless device may communicate a second reference signal with the second wireless device. The second reference signal may be based on a second FMCW and may have a second frequency bandwidth occupied by the second FMCW. The second frequency bandwidth may be smaller than the first frequency bandwidth, and the second reference signal may have a frequency location based on the first reference signal. For example, referring to FIG. 11, the first wireless device 1102 may communicate, at 1118, a second reference signal with the second wireless device 1104. Referring to FIG. 7, the first wireless device (the UE 702) may receive, at 712, from the second wireless device (the base station 704), the second reference signal (an FMCW with a small bandwidth). Referring to FIG. 8, the first wireless device (the UE 802) may transmit, at 814, to the second wireless device (the base station 804) the second reference signal (an FMCW with a small bandwidth). In some aspects, 1318 may be performed by the channel measurement component 198 or the channel measurement component 199.

At 1326, the first wireless device may communicate, based on a channel estimation for a channel between the first wireless device and the second wireless device based on the second reference signal, data with the second wireless device. For example, referring to FIG. 11, the first wireless device 1102 may communicate, at 1124, based on a channel estimation for a channel between the first wireless device 1102 and the second wireless device 1104, data with the second wireless device 1104. In some aspects, 1326 may be performed by the channel measurement component 198 or the channel measurement component 199.

In some aspects, the first reference signal may be based on a first FMCW configuration, and the second reference signal may be based on a second FMCW configuration. For example, referring to FIG. 7, the first reference signal (at 706) may be based on a first FMCW configuration (e.g., FMCW with a large bandwidth), and the second reference signal (at 712) may be based on a second FMCW configuration (e.g., FMCW with a small bandwidth).

In some aspects, the channel estimation based on the second reference signal may be the second channel estimation, and, in some aspects, at 1304, the first wireless device may obtain the first channel estimation for the channel, and the first channel estimation may be based on the first reference signal. For example, referring to FIG. 11, the channel estimation based on the second reference signal may be the second channel estimation (estimated at 1120), and the first wireless device 1102 may obtain, at 1108, the first channel estimation for the channel. The first channel estimation may be based on the first reference signal (communicated at 1106). In some aspects, 1304 may be performed by the channel measurement component 198 or the channel measurement component 199.

In some aspects, the first granularity for the first channel estimation may be larger than the second granularity for the second channel estimation. For example, referring to FIG. 11, the first granularity for the first channel estimation (at 1108) may be larger than the second granularity for the second channel estimation (at 1120).

In some aspects, to communicate the first reference signal with the second wireless device (at 1302), the first wireless device may transmit or receive the first reference signal periodically. For example, referring to FIG. 7, the first wireless device (the UE 702) may receive, at 706, the second reference signal (the FMCW with a large bandwidth) periodically.

In some aspects, to communicate the second reference signal with the second wireless device (at 1318), the first wireless device may transmit or receive the second reference signal periodically. For example, referring to FIG. 7, the first wireless device (the UE 702) may receive, at 712, the second reference signal (the FMCW with a small bandwidth) periodically.

In some aspects, at 1306, the first wireless device may, prior to being configured to communicate the second reference signal with the second wireless device (at 1318), select the frequency location of the second reference signal based on the first channel estimation. For example, referring to FIG. 11, the first wireless device 1102 may, at 1110, select the frequency location of the second reference signal based on the first channel estimation. In some aspects, 1306 may be performed by the channel measurement component 198 or the channel measurement component 199.

In some aspects, the frequency location of the second frequency bandwidth may be selected (at 1306) based on the gain on the first channel estimation. For example, referring to FIG. 11, the first wireless device 1102 may select, at 1110, the frequency location of the second frequency bandwidth based on the gain on the first channel estimation (obtained at 1108).

In some aspects, the frequency location of the second frequency bandwidth may be selected (at 1306) based on the variation on the first channel estimation. For example, referring to FIG. 11, the first wireless device 1102 may select, at 1110, the frequency location of the second frequency bandwidth based on the variation on the first channel estimation (obtained at 1108).

In some aspects, the first wireless device may be a UE, and the second wireless device may be a network node. For example, referring to FIGS. 7, 8, 9, and 10, the first wireless device may be a UE 702, 802, 902, or 1002, and the second wireless device may be a network node (the base station 704, 804, 904, or 1004).

In some aspects, to communicate the first reference signal with the second wireless device (at 1302), the first wireless device may receive the first reference signal from the second wireless device. To obtain the first channel estimation for the channel (at 1304), the first wireless device may estimate the channel based on the first reference signal to obtain the first channel estimation, and, in some aspects, at 1308, the first wireless device may transmit the first channel estimation to the second wireless device. For example, referring to FIG. 11, the first wireless device (the UE 702) may receive, at 706, the first reference signal (the FMCW with a large bandwidth) from the second wireless device (the base station 704). To obtain the first channel estimation for the channel, the first wireless device (the UE 702) may estimate the channel (perform wideband channel estimation) based on the first reference signal to obtain the first channel estimation. The first wireless device (the UE 702) may transmit, at 710, the first channel estimation (the wideband channel estimation results) to the second wireless device (the base station 704). In some aspects, 1308 may be performed by the channel measurement component 198.

In some aspects, the first wireless device may, at 1306, select the frequency location of the second reference signal based on the first channel estimation, and, at 1310, transmit the frequency location of the second reference signal to the second wireless device. For example, referring to FIG. 11, the first wireless device 1102 may, at 1110, select the frequency location of the second reference signal based on the first channel estimation. The first wireless device 1102 may transmit, at 1114, the frequency location of the second reference signal to the second wireless device 1104. In some aspects, 1310 may be performed by the channel measurement component 198.

In some aspects, to communicate the second reference signal with the second wireless device (at 1318), the first wireless device may receive the second reference signal from the second wireless device. In some aspects, the first wireless device may, at 1320, estimate the channel based on the second reference signal to obtain the second channel estimation, and, at 1322, transmit the second channel estimation to the second wireless device. For example, referring to FIG. 7, the first wireless device (the UE 702) may receive, at 712, the second reference signal (the FMCW with a small bandwidth) from the second wireless device (the base station 704). The first wireless device (the UE 702) may, at 714, estimate the channel based on the second reference signal (perform channel estimation with better granularity). At 716, the first wireless device (the UE 702) may transmit the second channel estimation (the channel estimation with better granularity) to the second wireless device (the base station 704). In some aspects, 1320 may be performed by the channel measurement component 198 or the channel measurement component 199. In some aspects, 1322 may be performed by the channel measurement component 198.

In some aspects, at 1312, the first wireless device may receive an indication triggering a transmission of the second reference signal from the second wireless device, and, to communicate the second reference signal with the second wireless device (at 1318), the first wireless device may transmit, to the second wireless device, in response to the indication, the second reference signal. For example, referring to FIG. 9, the first wireless device (the UE 902) may receive, at 910, an indication triggering a transmission of the second reference signal (an FMCW with a small bandwidth) from the second wireless device (the base station 904). Referring to FIG. 11, the first wireless device 1102 may receive, at 1116, an indication triggering a transmission of the second reference signal from the second wireless device 1104. In some aspects, 1312 may be performed by the channel measurement component 198.

In some aspects, to communicate the first reference signal with the second wireless device (at 1302), the first wireless device may transmit, to the second wireless device, the first reference signal. For example, referring to FIG. 9, the first wireless device (the UE 902) may transmit, at 906, to the second wireless device (the base station 904), the first reference signal (an FMCW with a large bandwidth).

In some aspects, to transmit the first reference signal to the second wireless device, the first wireless device may transmit, in response to the first frequency bandwidth greater than a UE baseband capability, the first reference signal using an analog transmission. For example, referring to FIG. 9, the first wireless device (the UE 902) may transmit, at 906, in response to the first frequency bandwidth greater than a UE baseband capability, the first reference signal (an FMCW with a large bandwidth) using an analog transmission.

In some aspects, at 1312, the first wireless device may receive, from the second wireless device, an indication triggering a transmission of the second reference signal, and, to communicate the second reference signal with the second wireless device (at 1318), the first wireless device may transmit, in response to the indication, the second reference signal to the second wireless device. For example, referring to FIG. 9, the first wireless device (the UE 902) may receive, at 910, from the second wireless device (the base station 904), an indication triggering a transmission of the second reference signal.

In some aspects, to communicate the second reference signal with the second wireless device (at 1318), the first wireless device may receive the second reference signal from the second wireless device, and, in some aspects, the first wireless device may, at 1320, estimate the channel to obtain the second channel estimation based on the second reference signal, and, at 1322, transmit the second channel estimation to the second wireless device. For example, referring to FIG. 10, the first wireless device (the UE 1002) may receive, at 1010, the second reference signal (an FMCW with a small bandwidth) from the second wireless device (the base station 1004). The first wireless device (the UE 1002) may, at 1012, estimate the channel to obtain the second channel estimation based on the second reference signal (perform channel estimation with better granularity), and transmit, at 1014, the second channel estimation (the channel estimation with better granularity) to the second wireless device (the base station 1004).

In some aspects, the first wireless device may be a network node, and the second wireless device may be a UE. For example, referring to FIGS. 7, 8, 9, 10, the first wireless device may be a network node (the base station 704, 804, 904, or 1004), and the second wireless device may be a UE 702, 802, 902, or 1002.

In some aspects, to communicate the first reference signal with the second wireless device (at 1302), the first wireless device may transmit the first reference signal to the second wireless device, and, in some aspects, the first wireless device may, at 1314, receive, from the second wireless device, the first channel estimation and the frequency location of the second reference signal. For example, referring to FIG. 7, the first wireless device (the base station 704) may transmit, at 706, the first reference signal (an FMCW with a large bandwidth) to the second wireless device (the UE 702) and, in some aspects, the first wireless device (the base station 704) may, at 710, receive, from the second wireless device (the UE 702), the first channel estimation and the frequency location of the second reference signal. In some aspects, 1314 may be performed by the channel measurement component 199.

In some aspects, to communicate the second reference signal with the second wireless device (at 1318), the first wireless device may transmit the second reference signal to the second wireless device. The second reference signal may be based on the first channel estimation. In some aspects, the first wireless device may, at 1324, receive the second channel estimation from the second wireless device. The second channel estimation may be based on the second reference signal. For example, referring to FIG. 7, the first wireless device (the base station 704) may transmit, at 712, the second reference signal (an FMCW with a small bandwidth) to the second wireless device (the UE 702). Referring to FIG. 9, the first wireless device (the base station 904) may, at 912, receive the second channel estimation from the second wireless device (the UE 902). In some aspects, 1324 may be performed by the channel measurement component 199.

In some aspects, to communicate the second reference signal with the second wireless device (at 1318), the first wireless device may receive the second reference signal from the second wireless device, and, in some aspects, the first wireless device may, prior to being configured to communicate the second reference signal, transmit, at 1316, an indication triggering the transmission of the second reference signal to the second wireless device, and, after being configured to communicate the second reference signal, estimate, at 1320, the channel based on the second reference signal to obtain the second channel estimation. For example, referring to FIG. 9, the first wireless device (the base station 904) may receive, at 912 the second reference signal (an FMCW with a small bandwidth) from the second wireless device (the UE 902). The first wireless device (the base station 904) may transmit, at 910, an indication triggering the transmission of the second reference signal to the second wireless device, and, after being configured to communicate the second reference signal, estimate, at 1320, the channel based on the second reference signal to obtain the second channel estimation. In some aspects, 1316 may be performed by the channel measurement component 198 or the channel measurement component 199.

In some aspects, to communicate the first reference signal with the second wireless device (at 1302), the first wireless device may receive the first reference signal from the second wireless device. To obtain the first channel estimation for the channel (at 1304), the first wireless device may estimate the channel based on the first reference signal to obtain the first channel estimation. For example, referring to FIG. 9, the first wireless device (the base station 904) may receive, at 906, the first reference signal from the second wireless device (the UE 902). The first wireless device (the base station 904) may, at 908, estimate the channel (perform wideband channel estimation) based on the first reference signal to obtain the first channel estimation.

In some aspects, to communicate the second reference signal with the second wireless device (at 1318), the first wireless device may receive the second reference signal from the second wireless device, and, in some aspects, the first wireless device may, prior to being configured to communicate the second reference signal (at 1318), transmit, at 1316, an indication triggering a transmission of the second reference signal to the second wireless device, and, after being configured to communicate the second reference signal (at 1318), estimate, at 1320, the channel based on the second reference signal to obtain the second channel estimation. For example, referring to FIG. 9, the first wireless device (the base station 904) may receive, at 912, the second reference signal (an FMCW with a small bandwidth) from the second wireless device (the UE 902). The first wireless device (the base station 904) may transmit, at 910, an indication triggering a transmission of the second reference signal to the second wireless device (the UE 902), and, at 914, estimate the channel (perform channel estimation with better granularity) based on the second reference signal to obtain the second channel estimation.

In some aspects, to communicate the second reference signal with the second wireless device (at 1318), the first wireless device may transmit the second reference signal to the second wireless device, and, in some aspects, the first wireless device may receive, at 1324, the second channel estimation from the second wireless device. The second channel estimation may be based on the second reference signal. For example, referring to FIG. 10, the first wireless device (the base station 1004) may transmit, at 1010, the second reference signal (an FMCW with a small bandwidth) to the second wireless device (the UE 1002). The first wireless device (the base station 1004) may receive, at 1014, the second channel estimation (the channel estimation with better granularity) from the second wireless device (the UE 1002). In some aspects, 1324 may be performed by the channel measurement component 198 or the channel measurement component 199.

Figure 14:
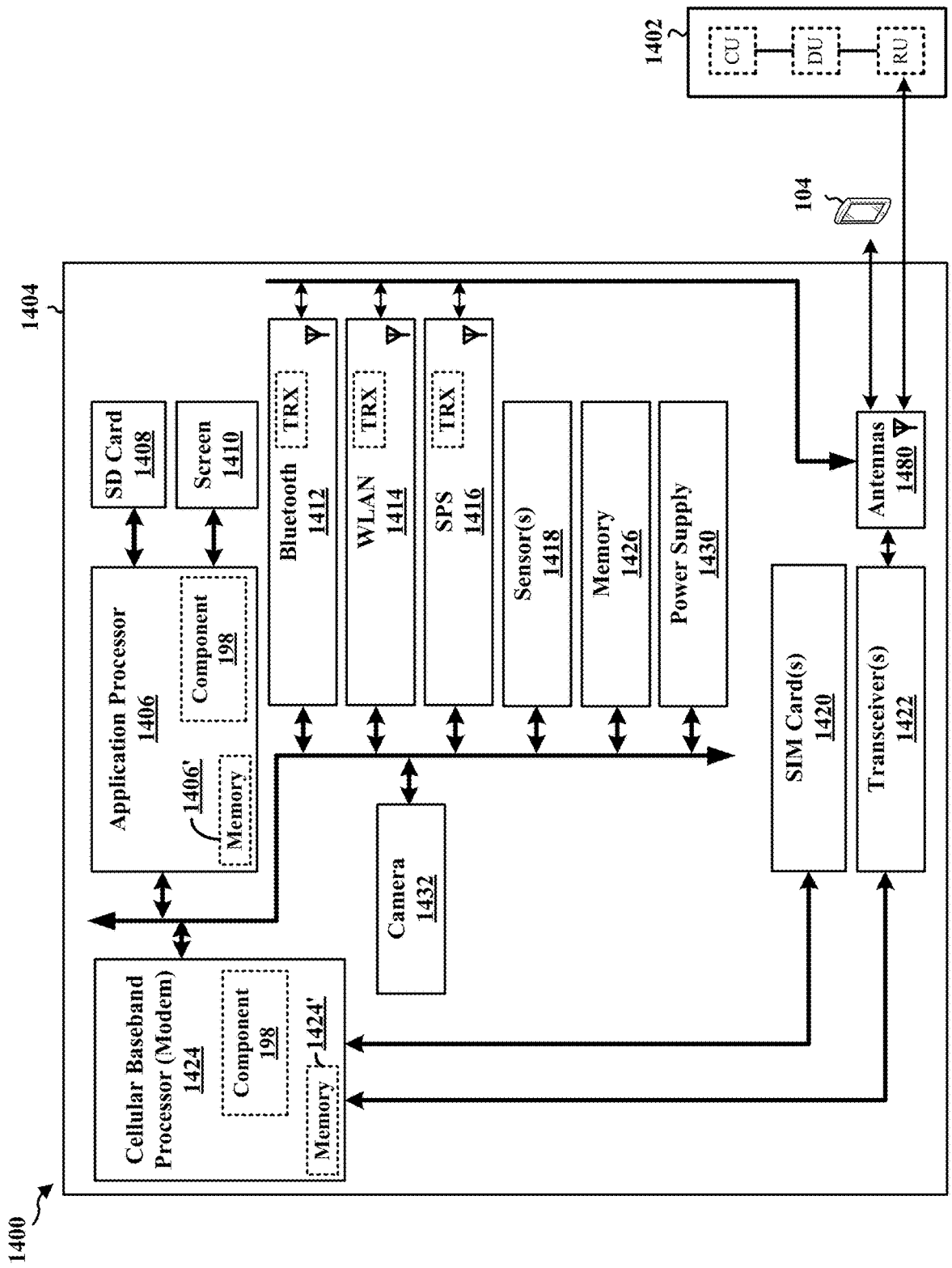
FIG. 14 is a diagram illustrating an example of a hardware implementation for an example apparatus and/or network entity.

FIG. 14 is a diagram 1400 illustrating an example of a hardware implementation for an apparatus 1404. The apparatus 1404 may be a UE, a component of a UE, or may implement UE functionality. In some aspects, the apparatus 1404 may include at least one cellular baseband processor 1424 (also referred to as a modem) coupled to one or more transceivers 1422 (e.g., cellular RF transceiver). The cellular baseband processor(s) 1424 may include at least one on-chip memory 1424'. In some aspects, the apparatus 1404 may further include one or more subscriber identity modules (SIM) cards 1420 and at least one application processor 1406 coupled to a secure digital (SD) card 1408 and a screen 1410. The application processor(s) 1406 may include on-chip memory 1406'. In some aspects, the apparatus 1404 may further include a Bluetooth module 1412, a WLAN module 1414, an SPS module 1416 (e.g., GNSS module), one or more sensor modules 1418 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1426, a power supply 1430, and/or a camera 1432. The Bluetooth module 1412, the WLAN module 1414, and the SPS module 1416 may include an on-chip transceiver (TRX) (or in some cases, just a receiver (RX)). The Bluetooth module 1412, the WLAN module 1414, and the SPS module 1416 may include their own dedicated antennas and/or utilize the antennas 1480 for communication. The cellular baseband processor(s) 1424 communicates through the transceiver(s) 1422 via one or more antennas 1480 with the UE 104 and/or with an RU associated with a network entity 1402. The cellular baseband processor(s) 1424 and the application processor(s) 1406 may each include a computer-readable medium/memory 1424', 1406', respectively. The additional memory modules 1426 may also be considered a computer-readable medium/memory. Each computer-readable medium/memory 1424', 1406', 1426 may be non-transitory. The cellular baseband processor(s) 1424 and the application processor(s) 1406 are each responsible for general processing, including the execution of software stored on the computer-readable medium/memory. The software, when executed by the cellular baseband processor(s) 1424/application processor(s) 1406, causes the cellular baseband processor(s) 1424/application processor(s) 1406 to perform the various functions described supra. The computer-readable medium/memory may also be used for storing data that is manipulated by the cellular baseband processor(s) 1424/ application processor(s) 1406 when executing software. The cellular baseband processor(s) 1424/application processor(s) 1406 may be a component of the UE 350 and may include the at least one memory 360 and/or at least one of the TX processor 368, the RX processor 356, and the controller/processor 359. In one configuration, the apparatus 1404 may be at least one processor chip (modem and/or application) and include just the cellular baseband processor(s) 1424 and/or the application processor(s) 1406, and in another configuration, the apparatus 1404 may be the entire UE (e.g., see UE 350 of FIG. 3) and include the additional modules of the apparatus 1404.

As discussed supra, the component 198 may be configured to communicate, with a second wireless device, a first reference signal, the first reference signal based on a first FMCW and having a first frequency bandwidth occupied by the first FMCW; communicate, with the second wireless device, a second reference signal, the second reference signal based on a second FMCW and having a second frequency bandwidth occupied by the second FMCW, the second frequency bandwidth smaller than the first frequency bandwidth, and the second reference signal having a frequency location based on the first reference signal; and communicate, based on a channel estimation for a channel between the first wireless device and the second wireless device based on the second reference signal, data with the second wireless device. The component 198 may be further configured to perform any of the aspects described in connection with the flowcharts in FIG. 12 and FIG. 13, and/or performed by the first wireless device 1102 in FIG. 11. The component 198 may be within the cellular baseband processor(s) 1424, the application processor(s) 1406, or both the cellular baseband processor(s) 1424 and the application processor(s) 1406. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1404 may include a variety of components configured for various functions. In one configuration, the apparatus 1404, and in particular the cellular baseband processor(s) 1424 and/or the application processor(s) 1406, includes means for communicating, with a second wireless device, a first reference signal, the first reference signal based on a first FMCW and having a first frequency bandwidth occupied by the first FMCW, means for communicating, with the second wireless device, a second reference signal, the second reference signal based on a second FMCW and having a second frequency bandwidth occupied by the second FMCW, the second frequency bandwidth smaller than the first frequency bandwidth, and the second reference signal having a frequency location based on the first reference signal, and means for communicating, based on a channel estimation for a channel between the first wireless device and the second wireless device based on the second reference signal, data with the second wireless device. The apparatus 1404 may further include means for performing any of the aspects described in connection with the flowcharts in FIG. 12 and FIG. 13, and/or aspects performed by the first wireless device 1102 in FIG. 11. The means may be the component 198 of the apparatus 1404 configured to perform the functions recited by the means. As described supra, the apparatus 1404 may include the TX processor 368, the RX processor 356, and the controller/processor 359. As such, in one configuration, the means may be the TX processor 368, the RX processor 356, and/or the controller/processor 359 configured to perform the functions recited by the means.

Figure 15:
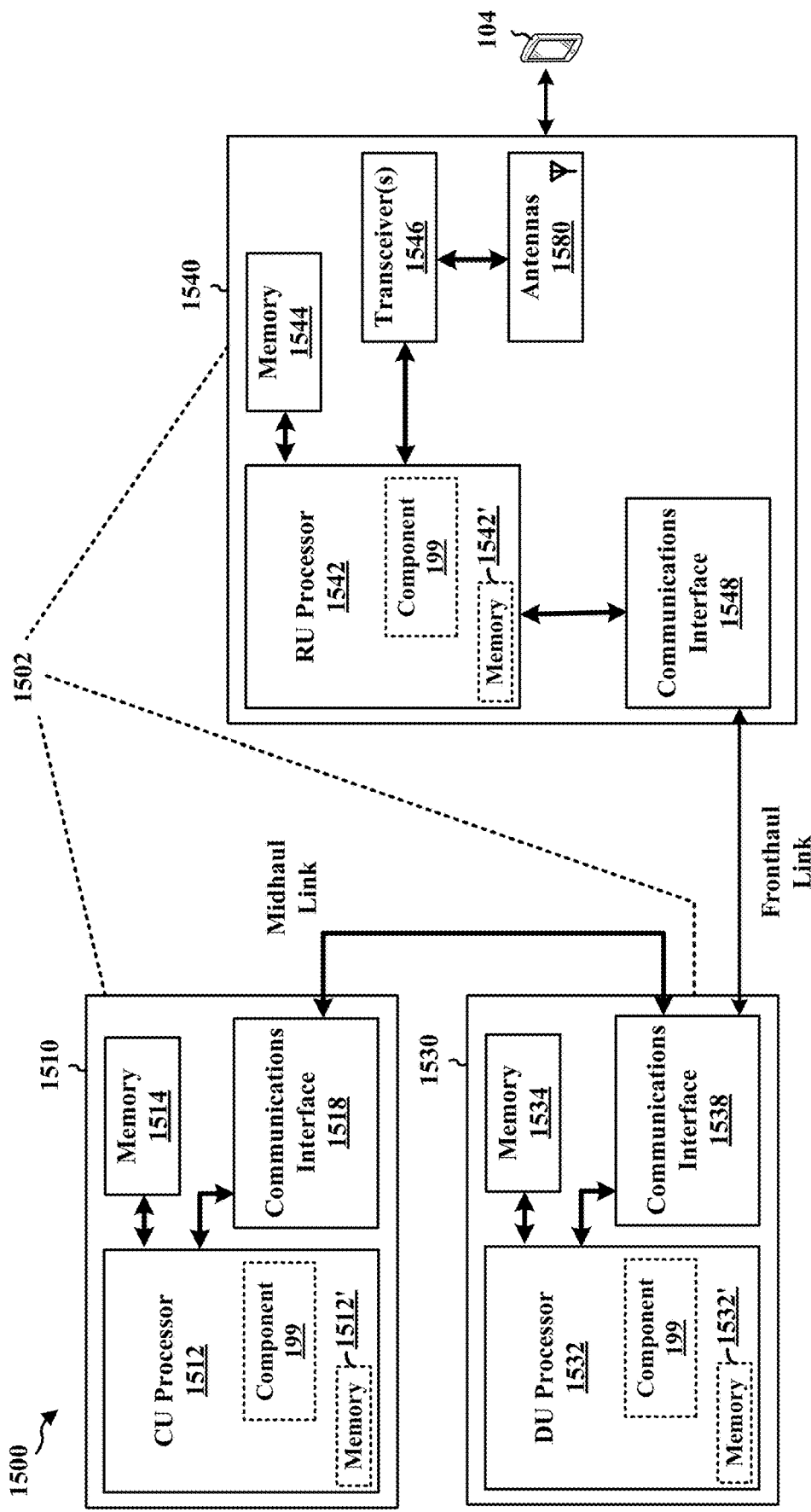
FIG. 15 is a diagram illustrating an example of a hardware implementation for an example network entity.

FIG. 15 is a diagram 1500 illustrating an example of a hardware implementation for a network entity 1502. The network entity 1502 may be a BS, a component of a BS, or may implement BS functionality. The network entity 1502 may include at least one of a CU 1510, a DU 1530, or an RU 1540. For example, depending on the layer functionality handled by the component 199, the network entity 1502 may include the CU 1510; both the CU 1510 and the DU 1530; each of the CU 1510, the DU 1530, and the RU 1540; the DU 1530; both the DU 1530 and the RU 1540; or the RU 1540. The CU 1510 may include at least one CU processor 1512. The CU processor(s) 1512 may include on-chip memory 1512'. In some aspects, the CU 1510 may further include additional memory modules 1514 and a communications interface 1518. The CU 1510 communicates with the DU 1530 through a midhaul link, such as an F1 interface. The DU 1530 may include at least one DU processor 1532. The DU processor(s) 1532 may include on-chip memory 1532'. In some aspects, the DU 1530 may further include additional memory modules 1534 and a communications interface 1538. The DU 1530 communicates with the RU 1540 through a fronthaul link. The RU 1540 may include at least one RU processor 1542. The RU processor(s) 1542 may include on-chip memory 1542'. In some aspects, the RU 1540 may further include additional memory modules 1544, one or more transceivers 1546, antennas 1580, and a communications interface 1548. The RU 1540 communicates with the UE 104. The on-chip memory 1512', 1532', 1542' and the additional memory modules 1514, 1534, 1544 may each be considered a computer-readable medium/memory. Each computer-readable medium/memory may be non-transitory. Each of the processors 1512, 1532, 1542 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to communicate, with a second wireless device, a first reference signal, the first reference signal based on a first FMCW and having a first frequency bandwidth occupied by the first FMCW; communicate, with the second wireless device, a second reference signal, the second reference signal based on a second FMCW and having a second frequency bandwidth occupied by the second FMCW, the second frequency bandwidth smaller than the first frequency bandwidth, and the second reference signal having a frequency location based on the first reference signal; and communicate, based on a channel estimation for a channel between the first wireless device and the second wireless device based on the second reference signal, data with the second wireless device. The component 199 may be further configured to perform any of the aspects described in connection with the flowcharts in FIG. 12 and FIG. 13, and/or performed by the first wireless device 1102 in FIG. 11. The component 199 may be within one or more processors of one or more of the CU 1510, DU 1530, and the RU 1540. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1502 may include a variety of components configured for various functions. In one configuration, the network entity 1502 includes means for communicating, with a second wireless device, a first reference signal, the first reference signal based on a first FMCW and having a first frequency bandwidth occupied by the first FMCW, means for communicating, with the second wireless device, a second reference signal, the second reference signal based on a second FMCW and having a second frequency bandwidth occupied by the second FMCW, the second frequency bandwidth smaller than the first frequency bandwidth, and the second reference signal having a frequency location based on the first reference signal, and means for communicating, based on a channel estimation for a channel between the first wireless device and the second wireless device based on the second reference signal, data with the second wireless device. The network entity 1502 may further include means for performing any of the aspects described in connection with the flowcharts in FIG. 12 and FIG. 13, and/or aspects performed by the first wireless device 1102 in FIG. 11. The means may be the component 199 of the network entity 1502 configured to perform the functions recited by the means. As described supra, the network entity 1502 may include the TX processor 316, the RX processor 370, and the controller/processor 375. As such, in one configuration, the means may be the TX processor 316, the RX processor 370, and/or the controller/processor 375 configured to perform the functions recited by the means.

This disclosure provides a method for wireless communication at a UE. The method may include communicating, with a second wireless device, a first reference signal, the first reference signal based on a first FMCW and having a first frequency bandwidth occupied by the first FMCW; communicating, with the second wireless device, a second reference signal, the second reference signal based on a second FMCW and having a second frequency bandwidth occupied by the second FMCW, the second frequency bandwidth smaller than the first frequency bandwidth, and the second reference signal having a frequency location based on the first reference signal; and communicating, based on a channel estimation for a channel between the first wireless device and the second wireless device based on the second reference signal, data with the second wireless device. The method involves a two-step FMCW-based approach for wideband channel estimation. The two-step approach allows for flexible control over the bandwidth being used for channel estimation and is applicable for different devices and use cases, such as mid-tier or IoT devices that may not support the full system bandwidth. This method allows both the network and the UE to efficiently allocate resources, as both can scan larger bandwidths to identify preferred sub-bands, and can be fine-tuned to specific channel conditions, improving the channel estimation accuracy.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a first wireless device. The method may include communicating, with a second wireless device, a first reference signal, the first reference signal based on a first frequency-modulated continuous wave (FMCW) and having a first frequency bandwidth occupied by the first FMCW; communicating, with the second wireless device, a second reference signal, the second reference signal based on a second FMCW and having a second frequency bandwidth occupied by the second FMCW, the second frequency bandwidth smaller than the first frequency bandwidth, and the second reference signal having a frequency location based on the first reference signal; and communicating, based on a channel estimation for a channel between the first wireless device and the second wireless device based on the second reference signal, data with the second wireless device.

Aspect 2 is the method of aspect 1, where the first reference signal is based on the first FMCW configuration, and the second reference signal is based on the second FMCW configuration.

Aspect 3 is the method of any of aspects 1 to 2, where the channel estimation based on the second reference signal is a second channel estimation, and the method may further include: obtaining a first channel estimation for the channel. The first channel estimation is based on the first reference signal.

Aspect 4 is the method of aspect 3, where a first granularity for the first channel estimation may be larger than a second granularity for the second channel estimation.

Aspect 5 is the method of any of aspects 1 to 4, where communicating, with the second wireless device, the first reference signal may include: transmitting or receiving the first reference signal periodically.

Aspect 6 is the method of any of aspects 1 to 4, where communicating, with the second wireless device, the second reference signal may include: transmitting or receiving the second reference signal periodically.

Aspect 7 is the method of any of aspects 1 to 4, where the method may further include: prior to communicating the second reference signal, selecting the frequency location of the second reference signal based on the first channel estimation.

Aspect 8 is the method of aspect 7, where the frequency location of the second frequency bandwidth may be selected based on the gain on the first channel estimation.

Aspect 9 is the method of aspect 7, where the frequency location of the second frequency bandwidth may be selected based on the variation on the first channel estimation.

Aspect 10 is the method of any of aspects 1 to 9, where the first wireless device may be a UE, the second wireless device may be a network node.

Aspect 11 is the method of aspect 10, where communicating, with the second wireless device, the first reference signal may include: receiving, from the second wireless device, the first reference signal. Obtaining the first channel estimation for the channel may include: estimating the channel based on the first reference signal to obtain the first channel estimation. The method may further include: transmitting, to the second wireless device, the first channel estimation.

Aspect 12 is the method of aspect 11, where the method may further include: selecting the frequency location of the second reference signal based on the first channel estimation; and transmitting, to the second wireless device, the frequency location of the second reference signal.

Aspect 13 is the method of aspect 12, where communicating, with the second wireless device, the second reference signal may include: receiving, from the second wireless device, the second reference signal, and the method may further include: estimating, based on the second reference signal, the channel to obtain the second channel estimation; and transmitting, to the second wireless device, the second channel estimation.

Aspect 14 is the method of aspect 12, where the method may further include: receiving, from the second wireless device, an indication triggering the transmission of the second reference signal. Communicating, with the second wireless device, the second reference signal may include: transmitting, to the second wireless device, in response to the indication, the second reference signal.

Aspect 15 is the method of aspect 10, where communicating, with the second wireless device, the first reference signal may include: transmitting, to the second wireless device, the first reference signal.

Aspect 16 is the method of aspect 15, where transmitting, to the second wireless device, the first reference signal may include: transmitting, in response to the first frequency bandwidth greater than a UE baseband capability, the first reference signal using an analog transmission.

Aspect 17 is the method of aspect 15, where the method may further include: receiving, from the second wireless device, an indication triggering the transmission of the second reference signal. Communicating, with the second wireless device, the second reference signal may include: transmitting, to the second wireless device, in response to the indication, the second reference signal.

Aspect 18 is the method of aspect 15, where communicating, with the second wireless device, the second reference signal may include: receiving, from the second wireless device, the second reference signal, and the method may further include: estimating, based on the second reference signal, the channel to obtain the second channel estimation; and transmitting the second channel estimation to the second wireless device.

Aspect 19 is the method of any of aspects 1 to 9, where the first wireless device may be a network node, and the second wireless device may be a UE.

Aspect 20 is the method of aspect 19, where communicating, with the second wireless device, the first reference signal may include: transmitting, to the second wireless device, the first reference signal, and the method may further include: receiving, from the second wireless device, the first channel estimation and the frequency location of the second reference signal.

Aspect 21 is the method of aspect 20, where communicating, with the second wireless device, the second reference signal may include: transmitting, to the second wireless device, the second reference signal. The second reference signal may be based on the first channel estimation. The method may further include: receiving, from the second wireless device, the second channel estimation. The channel estimation may be based on the second reference signal.

Aspect 22 is the method of aspect 20, where communicating, with the second wireless device, the second reference signal may include: receiving, from the second wireless device, the second reference signal. The method may further include: prior to communicating the second reference signal, transmitting, to the second wireless device, an indication triggering the transmission of the second reference signal, and, after communicating the second reference signal, estimating the channel based on the second reference signal to obtain the second channel estimation.

Aspect 23 is the method of aspect 19, where communicating, with the second wireless device, the first reference signal may include: receiving, from the second wireless device, the first reference signal. Obtaining the first channel estimation may include: estimating the channel based on the first reference signal to obtain the first channel estimation.

Aspect 24 is the method of aspect 23, where communicating, with the second wireless device, the second reference signal may include: receiving, from the second wireless device, the second reference signal. The method may further include: prior to communicating the second reference signal, transmitting, to the second wireless device, an indication triggering the transmission of the second reference signal, and, after communicating the second reference signal, estimating the channel based on the second reference signal to obtain the second channel estimation.

Aspect 25 is the method of aspect 23, where communicating, with the second wireless device, the second reference signal may include: transmitting, to the second wireless device, the second reference signal. The method may further include: receiving the second channel estimation from the second wireless device.

Aspect 26 is an apparatus for wireless communication at a first wireless device, including: at least one memory; and at least one processor coupled to the at least one memory and, based at least in part on information stored in the at least one memory, the at least one processor, individually or in any combination, is configured to perform the method of any of aspects 1-25.

Aspect 27 is the apparatus of aspect 26, further including at least one of a transceiver or an antenna coupled to the at least one processor and configured to communicate the first reference signal.

Aspect 28 is an apparatus for wireless communication including means for implementing the method of any of aspects 1-25.

Aspect 29 is a computer-readable medium (e.g., a non-transitory computer-readable medium) storing computer executable code, where the code when executed by at least one processor causes the at least one processor to, individually or in any combination, implement the method of any of aspects 1-25.

What is claimed is:

1. An apparatus of wireless communication at a first wireless device, comprising:
at least one memory; and
at least one processor coupled to the at least one memory and, based at least in part on information stored in the at least one memory, the at least one processor, individually or in any combination, is configured to:
communicate, with a second wireless device, a first reference signal, the first reference signal based on a first frequency-modulated continuous wave (FMCW) and having a first frequency bandwidth occupied by the first FMCW;
communicate, with the second wireless device, a second reference signal, the second reference signal based on a second FMCW and having a second frequency bandwidth occupied by the second FMCW, the second frequency bandwidth smaller than the first frequency bandwidth, and the second reference signal having a frequency location based on the first reference signal; and
communicate, based on a channel estimation for a channel between the first wireless device and the second wireless device based on the second reference signal, data with the second wireless device.

2. The apparatus of claim 1, further comprising a transceiver coupled to the at least one processor, wherein, to communicate the first reference signal, the at least one processor, individually or in any combination, is configured to communicate the first reference signal via the transceiver, and wherein the first reference signal is based on a first FMCW configuration, and the second reference signal is based on a second FMCW configuration.

3. The apparatus of claim 1, wherein the channel estimation based on the second reference signal is a second channel estimation, and wherein the at least one processor, individually or in any combination, is further configured to:
obtain a first channel estimation for the channel, wherein the first channel estimation is based on the first reference signal.

4. The apparatus of claim 3, wherein a first granularity for the first channel estimation is larger than a second granularity for the second channel estimation.

5. The apparatus of claim 4, wherein, to communicate, with the second wireless device, the first reference signal, the at least one processor, individually or in any combination, is configured to:
transmit or receive the first reference signal periodically.

6. The apparatus of claim 4, wherein, to communicate, with the second wireless device, the second reference signal, the at least one processor, individually or in any combination, is configured to:
transmit or receive the second reference signal periodically.

7. The apparatus of claim 4, wherein the at least one processor, individually or in any combination, is further configured to, prior to being configured to communicate, with the second wireless device, the second reference signal:
select the frequency location of the second reference signal based on the first channel estimation.

8. The apparatus of claim 7, wherein the frequency location of the second frequency bandwidth is selected based on a gain on the first channel estimation.

9. The apparatus of claim 7, wherein the frequency location of the second frequency bandwidth is selected based on a variation on the first channel estimation.

10. The apparatus of claim 4, wherein the first wireless device is a user equipment (UE), the second wireless device is a network node.

11. The apparatus of claim 10, wherein, to communicate, with the second wireless device, the first reference signal, the at least one processor, individually or in any combination, is configured to:
receive, from the second wireless device, the first reference signal, and wherein, to obtain the first channel estimation for the channel, the at least one processor, individually or in any combination, is configured to:
estimate the channel based on the first reference signal to obtain the first channel estimation, and wherein the at least one processor, individually or in any combination, is configured to:
transmit, to the second wireless device, the first channel estimation.

12. The apparatus of claim 11, wherein the at least one processor, individually or in any combination, is further configured to:
select the frequency location of the second reference signal based on the first channel estimation; and
transmit, to the second wireless device, the frequency location of the second reference signal.

13. The apparatus of claim 12, wherein, to communicate, with the second wireless device, the second reference signal, the at least one processor, individually or in any combination, is configured to:
receive, from the second wireless device, the second reference signal, and wherein the at least one processor, individually or in any combination, is further configured to:
estimate, based on the second reference signal, the channel to obtain the second channel estimation; and
transmit, to the second wireless device, the second channel estimation.

14. The apparatus of claim 12, wherein the at least one processor, individually or in any combination, is further configured to:
receive, from the second wireless device, an indication triggering a transmission of the second reference signal, and
wherein, to communicate, with the second wireless device, the second reference signal, the at least one processor, individually or in any combination, is configured to:
transmit, to the second wireless device, in response to the indication, the second reference signal.

15. The apparatus of claim 10, wherein, to communicate, with the second wireless device, the first reference signal, the at least one processor, individually or in any combination, is configured to:
transmit, to the second wireless device, the first reference signal.

16. The apparatus of claim 15, wherein, to transmit, to the second wireless device, the first reference signal, the at least one processor, individually or in any combination, is configured to:
transmit, in response to the first frequency bandwidth greater than a UE baseband capability, the first reference signal using an analog transmission.

17. The apparatus of claim 15, wherein the at least one processor, individually or in any combination, is further configured to:
receive, from the second wireless device, an indication triggering a transmission of the second reference signal, and wherein, to communicate, with the second wireless device, the second reference signal, the at least one processor, individually or in any combination, is configured to:
transmit, to the second wireless device, in response to the indication, the second reference signal.

18. The apparatus of claim 15, wherein, to communicate, with the second wireless device, the second reference signal, the at least one processor, individually or in any combination, is further configured to:
receive, from the second wireless device, the second reference signal, and wherein the at least one processor, individually or in any combination, is further configured to:
estimate, based on the second reference signal, the channel to obtain the second channel estimation; and
transmit the second channel estimation to the second wireless device.

19. The apparatus of claim 4, wherein the first wireless device is a network node, and the second wireless device is a user equipment (UE).

20. The apparatus of claim 19, wherein, to communicate, with the second wireless device, the first reference signal, the at least one processor, individually or in any combination, is configured to:
transmit, to the second wireless device, the first reference signal, and wherein the at least one processor, individually or in any combination, is further configured to:
receive, from the second wireless device, the first channel estimation and the frequency location of the second reference signal.

21. The apparatus of claim 20, wherein, to communicate, with the second wireless device, the second reference signal, the at least one processor, individually or in any combination, is configured to:
transmit, to the second wireless device, the second reference signal, wherein the second reference signal is based on the first channel estimation, and wherein the at least one processor, individually or in any combination, is further configured to:
receive, from the second wireless device, the second channel estimation, wherein the second channel estimation is based on the second reference signal.

22. The apparatus of claim 20, wherein, to communicate, with the second wireless device, the second reference signal, the at least one processor, individually or in any combination, is configured to:
receive, from the second wireless device, the second reference signal, and wherein the at least one processor, individually or in any combination, is further configured to:
prior to being configured to communicate the second reference signal, transmit, to the second wireless device, an indication triggering a transmission of the second reference signal, and
after being configured to communicate the second reference signal, estimate the channel based on the second reference signal to obtain the second channel estimation.

23. The apparatus of claim 19, wherein, to communicate, with the second wireless device, the first reference signal, the at least one processor, individually or in any combination, is configured to:
receive, from the second wireless device, the first reference signal, and wherein, to obtain the first channel estimation for the channel, the at least one processor, individually or in any combination, is further configured to:
estimate the channel based on the first reference signal to obtain the first channel estimation.

24. The apparatus of claim 23, wherein, to communicate, with the second wireless device, the second reference signal, the at least one processor, individually or in any combination, is configured to:
receive, from the second wireless device, the second reference signal, and wherein the at least one processor, individually or in any combination, is further configured to:
prior to being configured to communicate the second reference signal, transmit, to the second wireless device, an indication triggering a transmission of the second reference signal, and
after being configured to communicate the second reference signal, estimate the channel based on the second reference signal to obtain the second channel estimation.

25. The apparatus of claim 23, wherein, to communicate, with the second wireless device, the second reference signal, the at least one processor, individually or in any combination, is configured to:
transmit, to the second wireless device, the second reference signal, and wherein the at least one processor, individually or in any combination, is further configured to:
receive the second channel estimation from the second wireless device.

26. A method of wireless communication at a first wireless device, comprising:
communicating, with a second wireless device, a first reference signal, the first reference signal based on a first frequency-modulated continuous wave (FMCW) and having a first frequency bandwidth occupied by the first FMCW;
communicating, with the second wireless device, a second reference signal, the second reference signal based on a second FMCW and having a second frequency bandwidth occupied by the second FMCW, the second frequency bandwidth smaller than the first frequency bandwidth, and the second reference signal having a frequency location based on the first reference signal; and
communicating, based on a channel estimation for a channel between the first wireless device and the second wireless device based on the second reference signal, data with the second wireless device.

27. The method of claim 26, wherein the first reference signal is based on a first FMCW configuration, and the second reference signal is based on a second FMCW configuration.

28. The method of claim 26, wherein the channel estimation based on the second reference signal is a second channel estimation, and wherein the method further comprises:
obtaining a first channel estimation for the channel, wherein the first channel estimation is based on the first reference signal.

29. An apparatus for wireless communication at a first wireless device, comprising:
means for communicating, with a second wireless device, a first reference signal, the first reference signal based on a first frequency-modulated continuous wave (FMCW) and having a first frequency bandwidth occupied by the first FMCW;
means for communicating, with the second wireless device, a second reference signal, the second reference signal based on a second FMCW and having a second frequency bandwidth occupied by the second FMCW, the second frequency bandwidth smaller than the first frequency bandwidth, and the second reference signal having a frequency location based on the first reference signal; and
means for communicating, based on a channel estimation for a channel between the first wireless device and the second wireless device based on the second reference signal, data with the second wireless device.

30. A non-transitory computer-readable medium storing computer executable code at a first wireless device, wherein the code when executed by at least one processor causes the at least one processor to, individually or in any combination, implement a method of wireless communication, comprising:
communicating, with a second wireless device, a first reference signal, the first reference signal based on a first frequency-modulated continuous wave (FMCW) and having a first frequency bandwidth occupied by the first FMCW;
communicating, with the second wireless device, a second reference signal, the second reference signal based on a second FMCW and having a second frequency bandwidth occupied by the second FMCW, the second frequency bandwidth smaller than the first frequency bandwidth, and the second reference signal having a frequency location based on the first reference signal; and
communicating, based on a channel estimation for a channel between the first wireless device and the second wireless device based on the second reference signal, data with the second wireless device.

* * * * *